(12) United States Patent
Wheatley

(10) Patent No.: US 9,674,563 B2
(45) Date of Patent: Jun. 6, 2017

(54) SYSTEMS AND METHODS FOR RECOMMENDING CONTENT

(71) Applicant: Rovi Guides, Inc., San Carlos, CA (US)

(72) Inventor: David John Wheatley, Tower Lakes, IL (US)

(73) Assignee: ROVI GUIDES, INC., San Carlos, CA (US)

( * ) Notice: Subject to any disclaimer, the term of this patent is extended or adjusted under 35 U.S.C. 154(b) by 0 days.

(21) Appl. No.: 14/070,708

(22) Filed: Nov. 4, 2013

(65) Prior Publication Data

US 2015/0128158 A1 May 7, 2015

(51) Int. Cl.
| | |
|---|---|
| *H04H 60/33* | (2008.01) |
| *H04H 60/56* | (2008.01) |
| *H04N 21/25* | (2011.01) |
| *H04N 21/442* | (2011.01) |
| *H04N 21/422* | (2011.01) |
| *H04N 21/258* | (2011.01) |
| *H04N 21/4223* | (2011.01) |
| *H04N 21/482* | (2011.01) |
| *H04N 21/45* | (2011.01) |

(52) U.S. Cl.
CPC ..... *H04N 21/251* (2013.01); *H04N 21/25891* (2013.01); *H04N 21/4223* (2013.01); *H04N 21/42221* (2013.01); *H04N 21/44218* (2013.01); *H04N 21/4532* (2013.01); *H04N 21/4821* (2013.01); *H04N 21/4826* (2013.01)

(58) Field of Classification Search
CPC ........... H04N 21/251; H04N 21/44218; H04N 21/42221; H04N 21/25891; H04N 21/4223; H04N 21/4826; H04H 60/33; H04H 60/45

USPC .............................................. 725/10, 12, 46
See application file for complete search history.

(56) References Cited

U.S. PATENT DOCUMENTS

| | | | |
|---|---|---|---|
| 4,288,078 | A | 9/1981 | Lugo |
| 4,355,415 | A | 10/1982 | George et al. |
| 4,429,385 | A | 1/1984 | Cichelli et al. |

(Continued)

FOREIGN PATENT DOCUMENTS

| | | |
|---|---|---|
| CA | 2635571 | 5/2009 |
| CN | 101254344 A | 9/2008 |

(Continued)

OTHER PUBLICATIONS

U.S. Appl. No. 11/324,202, filed Dec. 29, 2005, Yates.

(Continued)

*Primary Examiner* — Nnenna Ekpo
(74) *Attorney, Agent, or Firm* — Ropes & Gray LLP

(57) ABSTRACT

Systems and methods for recommending content to a user are described. A user equipment device may be equipped with a built-in or separately connected image capturing device which may be used to pinpoint the location of the remote control when it is activated, thereby defining the specific location of the remote and the user. The relative location of the user in the room where the television is located may be associated with that particular user and used to automatically log in and access their user profile. This information may be used to enhance the television experience for the user by, e.g., recommending content.

24 Claims, 11 Drawing Sheets

(56) References Cited

U.S. PATENT DOCUMENTS

| | | | |
|---|---|---|---|
| 4,488,179 A | 12/1984 | Krüger et al. |
| 4,602,279 A | 7/1986 | Freeman |
| 4,605,964 A | 8/1986 | Chard |
| 4,625,080 A | 11/1986 | Scott |
| 4,627,620 A | 12/1986 | Yang |
| 4,630,910 A | 12/1986 | Ross et al. |
| 4,645,458 A | 2/1987 | Williams |
| 4,694,490 A | 9/1987 | Harvey et al. |
| 4,695,953 A | 9/1987 | Blair et al. |
| 4,702,475 A | 10/1987 | Elstein et al. |
| 4,704,725 A | 11/1987 | Harvey et al. |
| 4,706,121 A | 11/1987 | Young |
| 4,711,543 A | 12/1987 | Blair et al. |
| 4,718,107 A | 1/1988 | Hayes |
| 4,745,549 A | 5/1988 | Hashimoto |
| 4,751,578 A | 6/1988 | Reiter et al. |
| 4,751,642 A | 6/1988 | Silva et al. |
| 4,761,684 A | 8/1988 | Clark et al. |
| 4,787,063 A | 11/1988 | Muguet |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,847,698 A | 7/1989 | Freeman |
| 4,857,999 A | 8/1989 | Welsh |
| 4,893,183 A | 1/1990 | Nayar |
| 4,901,362 A | 2/1990 | Terzian |
| 4,908,707 A | 3/1990 | Kinghorn |
| 4,925,189 A | 5/1990 | Braeunig |
| 4,930,158 A | 5/1990 | Vogel |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 5,027,400 A | 6/1991 | Baji et al. |
| 5,036,314 A | 7/1991 | Barillari et al. |
| 5,047,867 A | 9/1991 | Strubbe et al. |
| 5,089,885 A | 2/1992 | Clark |
| 5,101,444 A | 3/1992 | Wilson et al. |
| 5,109,279 A | 4/1992 | Ando |
| 5,109,414 A | 4/1992 | Harvey et al. |
| 5,113,259 A | 5/1992 | Romesburg et al. |
| 5,132,992 A | 7/1992 | Yurt et al. |
| 5,134,719 A | 7/1992 | Mankovitz |
| 5,148,154 A | 9/1992 | MacKay et al. |
| 5,151,789 A | 9/1992 | Young |
| 5,155,591 A | 10/1992 | Wachob |
| 5,172,413 A | 12/1992 | Bradley et al. |
| 5,184,295 A | 2/1993 | Mann |
| 5,200,822 A | 4/1993 | Bronfin et al. |
| 5,223,924 A | 6/1993 | Strubbe |
| 5,229,754 A | 7/1993 | Aoki et al. |
| 5,229,756 A | 7/1993 | Kosugi et al. |
| 5,231,493 A | 7/1993 | Apitz |
| 5,233,423 A | 8/1993 | Jernigan et al. |
| 5,233,654 A | 8/1993 | Harvey et al. |
| 5,239,463 A | 8/1993 | Blair et al. |
| 5,239,464 A | 8/1993 | Blair et al. |
| 5,249,043 A | 9/1993 | Grandmougin |
| 5,253,066 A | 10/1993 | Vogel |
| 5,288,078 A | 2/1994 | Capper et al. |
| 5,295,491 A | 3/1994 | Gevins |
| 5,299,006 A | 3/1994 | Kim |
| 5,320,538 A | 6/1994 | Baum |
| 5,335,277 A | 8/1994 | Harvey et al. |
| 5,339,434 A | 8/1994 | Rusis |
| 5,341,350 A | 8/1994 | Frank et al. |
| 5,347,306 A | 9/1994 | Nitta |
| 5,353,121 A | 10/1994 | Young et al. |
| 5,357,276 A | 10/1994 | Banker et al. |
| 5,359,367 A | 10/1994 | Stockill |
| 5,382,983 A | 1/1995 | Kwoh et al. |
| 5,385,519 A | 1/1995 | Hsu et al. |
| 5,404,567 A | 4/1995 | DePietro et al. |
| 5,405,152 A | 4/1995 | Katanics et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,417,210 A | 5/1995 | Funda et al. |
| 5,423,554 A | 6/1995 | Davis |
| 5,426,699 A | 6/1995 | Wunderlich et al. |
| 5,442,389 A | 8/1995 | Blahut et al. |
| 5,442,390 A | 8/1995 | Hooper et al. |
| 5,453,779 A | 9/1995 | Dan et al. |
| 5,454,043 A | 9/1995 | Freeman |
| 5,455,570 A | 10/1995 | Cook et al. |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,469,740 A | 11/1995 | French et al. |
| 5,479,266 A | 12/1995 | Young et al. |
| 5,479,268 A | 12/1995 | Young et al. |
| 5,479,302 A | 12/1995 | Haines |
| 5,481,296 A | 1/1996 | Cragun et al. |
| 5,483,278 A | 1/1996 | Strubbe et al. |
| 5,485,197 A | 1/1996 | Hoarty |
| 5,495,576 A | 2/1996 | Ritchey |
| 5,502,504 A | 3/1996 | Marshall et al. |
| 5,506,932 A | 4/1996 | Holmes et al. |
| 5,509,908 A | 4/1996 | Hillstead et al. |
| 5,516,105 A | 5/1996 | Eisenbrey et al. |
| 5,517,254 A | 5/1996 | Monta et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,524,271 A | 6/1996 | Hollmann et al. |
| 5,524,637 A | 6/1996 | Erickson |
| 5,526,034 A | 6/1996 | Hoarty et al. |
| 5,528,304 A | 6/1996 | Cherrick et al. |
| 5,528,513 A | 6/1996 | Vaitzblit et al. |
| 5,534,911 A | 7/1996 | Levitan |
| 5,534,917 A | 7/1996 | MacDougall |
| 5,537,141 A | 7/1996 | Harper et al. |
| 5,539,449 A | 7/1996 | Blahut et al. |
| 5,539,880 A | 7/1996 | Lakhani |
| 5,541,638 A | 7/1996 | Story |
| 5,541,738 A | 7/1996 | Mankovitz |
| 5,548,338 A | 8/1996 | Ellis et al. |
| 5,550,576 A | 8/1996 | Klosterman |
| 5,550,825 A | 8/1996 | McMullan, Jr. et al. |
| 5,557,338 A | 9/1996 | Maze et al. |
| 5,557,724 A | 9/1996 | Sampat et al. |
| 5,559,548 A | 9/1996 | Davis et al. |
| 5,559,549 A | 9/1996 | Hendricks et al. |
| 5,559,550 A | 9/1996 | Mankovitz |
| 5,563,988 A | 10/1996 | Maes et al. |
| 5,570,295 A | 10/1996 | Isenberg et al. |
| 5,572,442 A | 11/1996 | Schulhof et al. |
| 5,574,778 A | 11/1996 | Ely et al. |
| 5,576,755 A | 11/1996 | Davis et al. |
| 5,577,981 A | 11/1996 | Jarvik |
| 5,579,239 A | 11/1996 | Freeman et al. |
| 5,580,249 A | 12/1996 | Jacobsen et al. |
| 5,583,560 A | 12/1996 | Florin et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,586,264 A | 12/1996 | Belknap et al. |
| 5,589,892 A | 12/1996 | Knee et al. |
| 5,592,551 A | 1/1997 | Lett et al. |
| 5,594,469 A | 1/1997 | Freeman et al. |
| 5,594,509 A | 1/1997 | Florin et al. |
| 5,594,779 A | 1/1997 | Goodman |
| 5,596,373 A | 1/1997 | White et al. |
| 5,597,309 A | 1/1997 | Riess |
| 5,600,364 A | 2/1997 | Hendricks et al. |
| 5,602,582 A | 2/1997 | Wanderscheid et al. |
| 5,606,374 A | 2/1997 | Bertram |

(56) References Cited

U.S. PATENT DOCUMENTS

| | | |
|---|---|---|
| 5,606,642 A | 2/1997 | Stautner et al. |
| 5,610,653 A | 3/1997 | Abecassis |
| 5,616,078 A | 4/1997 | Oh |
| 5,616,876 A | 4/1997 | Cluts |
| 5,617,312 A | 4/1997 | Iura et al. |
| 5,617,526 A | 4/1997 | Oran et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,625,678 A | 4/1997 | Blomfield-Brown |
| 5,629,733 A | 5/1997 | Youman et al. |
| 5,629,867 A | 5/1997 | Goldman |
| 5,630,060 A | 5/1997 | Tang et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,635,987 A | 6/1997 | Park et al. |
| 5,638,300 A | 6/1997 | Johnson |
| 5,640,484 A | 6/1997 | Mankovitz |
| 5,641,288 A | 6/1997 | Zaenglein, Jr. |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,666,293 A | 9/1997 | Metz et al. |
| 5,666,645 A | 9/1997 | Thomas et al. |
| 5,671,377 A | 9/1997 | Bleidt et al. |
| 5,673,089 A | 9/1997 | Yuen et al. |
| 5,675,390 A | 10/1997 | Schindler et al. |
| 5,675,743 A | 10/1997 | Mavity |
| 5,682,196 A | 10/1997 | Freeman |
| 5,682,206 A | 10/1997 | Wehmeyer et al. |
| 5,682,229 A | 10/1997 | Wangler |
| 5,684,525 A | 11/1997 | Klosterman |
| 5,690,582 A | 11/1997 | Ulrich et al. |
| 5,692,214 A | 11/1997 | Levine |
| 5,694,163 A | 12/1997 | Harrison |
| 5,696,765 A | 12/1997 | Safadi |
| 5,699,107 A | 12/1997 | Lawler et al. |
| 5,703,367 A | 12/1997 | Hashimoto et al. |
| 5,704,837 A | 1/1998 | Iwasaki et al. |
| 5,708,961 A | 1/1998 | Hylton et al. |
| 5,710,601 A | 1/1998 | Marshall et al. |
| 5,715,834 A | 2/1998 | Bergamasco et al. |
| 5,717,452 A | 2/1998 | Janin et al. |
| 5,721,829 A | 2/1998 | Dunn et al. |
| 5,727,060 A | 3/1998 | Young |
| 5,732,216 A | 3/1998 | Logan et al. |
| 5,734,119 A | 3/1998 | France et al. |
| 5,734,853 A | 3/1998 | Hendricks et al. |
| 5,734,893 A | 3/1998 | Li et al. |
| 5,742,443 A | 4/1998 | Tsao et al. |
| 5,745,710 A | 4/1998 | Clanton, III et al. |
| 5,748,191 A | 5/1998 | Rozak et al. |
| 5,748,716 A | 5/1998 | Levine |
| 5,751,282 A | 5/1998 | Girard et al. |
| 5,751,672 A | 5/1998 | Yankowski et al. |
| 5,752,159 A | 5/1998 | Faust et al. |
| 5,752,160 A | 5/1998 | Dunn |
| 5,754,771 A | 5/1998 | Epperson et al. |
| 5,758,257 A | 5/1998 | Herz et al. |
| 5,758,258 A | 5/1998 | Shoff et al. |
| 5,758,259 A | 5/1998 | Lawler |
| 5,760,821 A | 6/1998 | Ellis et al. |
| 5,761,417 A | 6/1998 | Henley et al. |
| 5,761,607 A | 6/1998 | Gudesen et al. |
| 5,768,528 A | 6/1998 | Stumm |
| 5,771,354 A | 6/1998 | Crawford et al. |
| 5,774,170 A | 6/1998 | Hite et al. |
| 5,778,181 A | 7/1998 | Hidary et al. |
| 5,778,182 A | 7/1998 | Cathey et al. |
| 5,778,187 A | 7/1998 | Monteiro et al. |
| 5,781,226 A | 7/1998 | Sheehan |
| 5,781,227 A | 7/1998 | Goode et al. |
| 5,781,228 A | 7/1998 | Sposato |
| 5,781,246 A | 7/1998 | Alten et al. |
| 5,787,259 A | 7/1998 | Haroun et al. |
| 5,788,507 A | 8/1998 | Redford et al. |
| 5,790,198 A | 8/1998 | Roop et al. |
| 5,790,202 A | 8/1998 | Kummer et al. |
| 5,790,423 A | 8/1998 | Lau et al. |
| 5,793,366 A | 8/1998 | Mano et al. |
| 5,793,412 A | 8/1998 | Asamizuya |
| 5,793,964 A | 8/1998 | Rogers et al. |
| 5,793,971 A | 8/1998 | Fujita et al. |
| 5,794,217 A | 8/1998 | Allen |
| 5,796,952 A | 8/1998 | Davis et al. |
| 5,798,785 A | 8/1998 | Hendricks et al. |
| 5,798,921 A | 8/1998 | Johnson et al. |
| 5,802,284 A | 9/1998 | Karlton et al. |
| 5,805,154 A | 9/1998 | Brown |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,246 A | 9/1998 | Goldman |
| 5,812,123 A | 9/1998 | Rowe et al. |
| 5,812,205 A | 9/1998 | Milnes et al. |
| 5,812,931 A | 9/1998 | Yuen |
| 5,815,146 A | 9/1998 | Youden et al. |
| 5,815,297 A | 9/1998 | Ciciora |
| 5,818,438 A | 10/1998 | Howe et al. |
| 5,819,019 A | 10/1998 | Nelson |
| 5,819,160 A | 10/1998 | Foladare et al. |
| 5,822,530 A | 10/1998 | Brown |
| 5,828,420 A | 10/1998 | Marshall et al. |
| RE35,954 E | 11/1998 | Levine |
| 5,835,126 A | 11/1998 | Lewis |
| 5,841,979 A | 11/1998 | Schulhof et al. |
| 5,844,620 A | 12/1998 | Coleman et al. |
| 5,850,218 A | 12/1998 | LaJoie et al. |
| 5,858,866 A | 1/1999 | Berry et al. |
| 5,861,906 A | 1/1999 | Dunn et al. |
| 5,867,233 A | 2/1999 | Tanaka et al. |
| 5,872,588 A | 2/1999 | Aras et al. |
| 5,875,108 A | 2/1999 | Hoffberg et al. |
| 5,877,803 A | 3/1999 | Wee et al. |
| 5,880,768 A | 3/1999 | Lemmons et al. |
| 5,881,245 A | 3/1999 | Thompson |
| 5,883,621 A | 3/1999 | Iwamura |
| 5,884,028 A | 3/1999 | Kindell et al. |
| 5,884,141 A | 3/1999 | Inoue et al. |
| 5,886,707 A | 3/1999 | Berg |
| 5,886,732 A | 3/1999 | Humpleman |
| 5,886,746 A | 3/1999 | Yuen et al. |
| 5,887,243 A | 3/1999 | Harvey et al. |
| 5,892,915 A | 4/1999 | Duso et al. |
| 5,894,589 A | 4/1999 | Reber et al. |
| 5,896,414 A | 4/1999 | Meyer et al. |
| 5,898,441 A | 4/1999 | Flurry |
| 5,898,456 A | 4/1999 | Wahl |
| 5,899,582 A | 5/1999 | DuLac |
| 5,900,904 A | 5/1999 | Okada et al. |
| 5,903,234 A | 5/1999 | Kimura |
| 5,903,263 A | 5/1999 | Emura |
| 5,903,264 A | 5/1999 | Moeller et al. |
| 5,905,522 A | 5/1999 | Lawler |
| 5,905,847 A | 5/1999 | Kobayashi et al. |
| 5,907,323 A | 5/1999 | Lawler et al. |
| 5,909,638 A | 6/1999 | Allen |
| 5,911,046 A | 6/1999 | Amano |
| 5,913,039 A | 6/1999 | Nakamura et al. |
| 5,913,727 A | 6/1999 | Ahdoot |
| 5,914,746 A | 6/1999 | Matthews, III et al. |
| 5,914,941 A | 6/1999 | Janky |
| 5,915,090 A | 6/1999 | Joseph et al. |
| 5,915,094 A | 6/1999 | Kouloheris et al. |
| 5,916,303 A | 6/1999 | Scott |

(56) References Cited

U.S. PATENT DOCUMENTS

| | | |
|---|---|---|
| 5,917,538 A | 6/1999 | Asamizuya |
| 5,917,835 A | 6/1999 | Barrett et al. |
| 5,920,702 A | 7/1999 | Bleidt et al. |
| 5,920,800 A | 7/1999 | Schafer |
| 5,922,045 A | 7/1999 | Hanson |
| 5,922,048 A | 7/1999 | Emura |
| 5,923,361 A | 7/1999 | Sutton, Jr. |
| 5,926,204 A | 7/1999 | Mayer |
| 5,926,205 A | 7/1999 | Krause et al. |
| 5,926,624 A | 7/1999 | Katz et al. |
| 5,928,327 A | 7/1999 | Wang et al. |
| 5,929,849 A | 7/1999 | Kikinis |
| 5,929,850 A | 7/1999 | Broadwin et al. |
| 5,930,473 A | 7/1999 | Teng et al. |
| 5,930,493 A | 7/1999 | Ottesen et al. |
| 5,931,901 A | 8/1999 | Wolfe et al. |
| 5,933,125 A | 8/1999 | Fernie et al. |
| 5,933,603 A | 8/1999 | Vahalia et al. |
| 5,933,835 A | 8/1999 | Adams et al. |
| 5,935,206 A | 8/1999 | Dixon et al. |
| 5,936,569 A | 8/1999 | Ståhle et al. |
| 5,940,071 A | 8/1999 | Treffers et al. |
| 5,940,073 A | 8/1999 | Klosterman et al. |
| 5,943,046 A | 8/1999 | Cave et al. |
| 5,943,047 A | 8/1999 | Suzuki |
| 5,945,987 A | 8/1999 | Dunn |
| 5,945,988 A | 8/1999 | Williams et al. |
| 5,947,746 A | 9/1999 | Tsai |
| 5,949,411 A | 9/1999 | Doerr et al. |
| 5,956,482 A | 9/1999 | Agraharam et al. |
| 5,956,716 A | 9/1999 | Kenner et al. |
| 5,959,659 A | 9/1999 | Dokic |
| 5,961,603 A | 10/1999 | Kunkel et al. |
| 5,963,202 A | 10/1999 | Polish |
| 5,964,455 A | 10/1999 | Catanzarite et al. |
| 5,969,283 A | 10/1999 | Looney et al. |
| 5,969,714 A | 10/1999 | Butcher |
| 5,973,680 A | 10/1999 | Ueda |
| 5,973,722 A | 10/1999 | Wakai et al. |
| 5,974,217 A | 10/1999 | Haraguchi |
| 5,977,963 A | 11/1999 | Gaughan et al. |
| 5,977,964 A | 11/1999 | Williams et al. |
| 5,978,567 A | 11/1999 | Rebane et al. |
| 5,978,843 A | 11/1999 | Wu et al. |
| 5,980,256 A | 11/1999 | Carmein |
| 5,986,650 A | 11/1999 | Ellis et al. |
| 5,988,078 A | 11/1999 | Levine |
| 5,989,157 A | 11/1999 | Walton |
| 5,990,881 A | 11/1999 | Inoue et al. |
| 5,995,649 A | 11/1999 | Marugame |
| 5,999,970 A | 12/1999 | Krisbergh et al. |
| 6,002,394 A | 12/1999 | Schein et al. |
| 6,002,720 A | 12/1999 | Yurt et al. |
| 6,005,548 A | 12/1999 | Latypov et al. |
| 6,005,564 A | 12/1999 | Ahmad et al. |
| 6,005,600 A | 12/1999 | Hill |
| 6,008,802 A | 12/1999 | Iki et al. |
| 6,009,210 A | 12/1999 | Kang |
| 6,009,465 A | 12/1999 | Decker et al. |
| 6,012,089 A | 1/2000 | Hasegawa |
| 6,012,091 A | 1/2000 | Boyce |
| 6,014,184 A | 1/2000 | Knee et al. |
| 6,014,381 A | 1/2000 | Troxel et al. |
| 6,014,693 A | 1/2000 | Ito et al. |
| 6,014,694 A | 1/2000 | Aharoni et al. |
| 6,014,706 A | 1/2000 | Cannon et al. |
| 6,016,141 A | 1/2000 | Knudson et al. |
| 6,018,359 A | 1/2000 | Kermode et al. |
| 6,018,765 A | 1/2000 | Durana et al. |
| 6,020,912 A | 2/2000 | De Lang |
| 6,022,223 A | 2/2000 | Taniguchi et al. |
| 6,023,725 A | 2/2000 | Ozawa et al. |
| 6,025,837 A | 2/2000 | Matthews, III et al. |
| 6,025,868 A | 2/2000 | Russo |
| 6,028,600 A | 2/2000 | Rosin et al. |
| 6,029,064 A | 2/2000 | Farris et al. |
| 6,032,202 A | 2/2000 | Lea et al. |
| 6,038,591 A | 3/2000 | Wolfe et al. |
| 6,038,614 A | 3/2000 | Chan et al. |
| 6,049,831 A | 4/2000 | Gardell et al. |
| 6,052,145 A | 4/2000 | Macrae et al. |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,085,236 A | 7/2000 | Lea |
| 6,091,883 A | 7/2000 | Artigalas et al. |
| 6,097,441 A | 8/2000 | Allport |
| 6,098,082 A | 8/2000 | Gibbon et al. |
| 6,098,458 A | 8/2000 | French et al. |
| 6,100,896 A | 8/2000 | Strohecker et al. |
| 6,101,289 A | 8/2000 | Kellner |
| 6,104,334 A | 8/2000 | Allport |
| 6,111,677 A | 8/2000 | Shintani et al. |
| 6,112,186 A | 8/2000 | Bergh et al. |
| 6,118,450 A | 9/2000 | Proehl et al. |
| 6,125,230 A | 9/2000 | Yaginuma |
| 6,128,003 A | 10/2000 | Smith et al. |
| 6,130,677 A | 10/2000 | Kunz |
| 6,130,726 A | 10/2000 | Darbee et al. |
| 6,141,003 A | 10/2000 | Chor |
| 6,141,463 A | 10/2000 | Covell et al. |
| 6,141,488 A | 10/2000 | Knudson et al. |
| 6,147,678 A | 11/2000 | Kumar et al. |
| 6,147,715 A | 11/2000 | Yuen et al. |
| 6,152,856 A | 11/2000 | Studor et al. |
| 6,154,206 A | 11/2000 | Ludtke |
| 6,159,100 A | 12/2000 | Smith |
| 6,160,546 A | 12/2000 | Thompson et al. |
| 6,160,796 A | 12/2000 | Zou |
| 6,166,730 A | 12/2000 | Goode et al. |
| 6,167,188 A | 12/2000 | Young et al. |
| 6,169,543 B1 | 1/2001 | Wehmeyer |
| 6,169,725 B1 | 1/2001 | Gibbs et al. |
| 6,170,006 B1 | 1/2001 | Namba |
| 6,173,066 B1 | 1/2001 | Peurach et al. |
| 6,177,931 B1 | 1/2001 | Alexander et al. |
| 6,181,343 B1 | 1/2001 | Lyons |
| 6,182,094 B1 | 1/2001 | Humpleman et al. |
| 6,184,878 B1 | 2/2001 | Alonso et al. |
| 6,188,777 B1 | 2/2001 | Darrell et al. |
| 6,208,335 B1 | 3/2001 | Gordon et al. |
| 6,208,341 B1 | 3/2001 | van Ee et al. |
| 6,208,384 B1 | 3/2001 | Schultheiss |
| 6,215,890 B1 | 4/2001 | Matsuo et al. |
| 6,215,898 B1 | 4/2001 | Woodfill et al. |
| 6,219,839 B1 | 4/2001 | Sampsell |
| 6,226,396 B1 | 5/2001 | Marugame |
| 6,226,444 B1 | 5/2001 | Goldschmidt Iki et al. |
| 6,226,618 B1 | 5/2001 | Downs et al. |
| 6,229,913 B1 | 5/2001 | Nayar et al. |
| 6,232,539 B1 | 5/2001 | Looney et al. |
| 6,233,734 B1 | 5/2001 | Macrae et al. |
| 6,236,395 B1 | 5/2001 | Sezan et al. |
| 6,237,049 B1 | 5/2001 | Ludtke |
| 6,239,794 B1 | 5/2001 | Yuen et al. |
| 6,243,104 B1 | 6/2001 | Murray |
| 6,243,707 B1 | 6/2001 | Humpleman et al. |
| 6,243,725 B1 | 6/2001 | Hempleman et al. |
| 6,256,033 B1 | 7/2001 | Nguyen |
| 6,256,400 B1 | 7/2001 | Takata et al. |
| 6,263,501 B1 | 7/2001 | Schein et al. |
| 6,263,503 B1 | 7/2001 | Margulis |
| 6,268,849 B1 | 7/2001 | Boyer et al. |
| 6,283,860 B1 | 9/2001 | Lyons et al. |
| 6,289,112 B1 | 9/2001 | Jain et al. |
| 6,289,165 B1 | 9/2001 | Abecassis |
| 6,299,308 B1 | 10/2001 | Voronka et al. |
| 6,308,565 B1 | 10/2001 | French et al. |
| 6,310,886 B1 | 10/2001 | Barton |
| 6,314,575 B1 | 11/2001 | Billock et al. |
| 6,316,934 B1 | 11/2001 | Amorai-Moriya et al. |

(56) References Cited

U.S. PATENT DOCUMENTS

| | | |
|---|---|---|
| 6,324,338 B1 | 11/2001 | Wood et al. |
| 6,331,877 B1 | 12/2001 | Bennington et al. |
| 6,353,700 B1 | 3/2002 | Zhou |
| 6,354,378 B1 | 3/2002 | Patel |
| 6,356,971 B1 | 3/2002 | Katz et al. |
| 6,357,043 B1 | 3/2002 | Ellis et al. |
| 6,359,661 B1 | 3/2002 | Nickum |
| 6,363,160 B1 | 3/2002 | Bradski et al. |
| 6,384,819 B1 | 5/2002 | Hunter |
| 6,388,714 B1 | 5/2002 | Schein et al. |
| 6,393,430 B1 | 5/2002 | Van Ryzin |
| 6,411,744 B1 | 6/2002 | Edwards |
| 6,418,556 B1 | 7/2002 | Bennington et al. |
| 6,430,997 B1 | 8/2002 | French et al. |
| 6,441,832 B1 | 8/2002 | Tao et al. |
| 6,456,621 B1 | 9/2002 | Wada et al. |
| RE37,881 E | 10/2002 | Haines |
| 6,463,585 B1 | 10/2002 | Hendricks et al. |
| 6,466,080 B2 | 10/2002 | Kawai et al. |
| 6,473,559 B1 | 10/2002 | Knudson et al. |
| 6,476,834 B1 | 11/2002 | Doval et al. |
| 6,483,986 B1 | 11/2002 | Krapf |
| 6,487,145 B1 | 11/2002 | Berhan |
| 6,487,362 B1 | 11/2002 | Yuen et al. |
| 6,496,598 B1 | 12/2002 | Harman |
| 6,496,981 B1 | 12/2002 | Wistendahl et al. |
| 6,498,895 B2 | 12/2002 | Young et al. |
| 6,503,195 B1 | 1/2003 | Keller et al. |
| 6,505,348 B1 | 1/2003 | Knowles et al. |
| 6,522,342 B1 | 2/2003 | Gagnon et al. |
| 6,536,041 B1 | 3/2003 | Knudson et al. |
| 6,539,931 B2 | 4/2003 | Trajkovic et al. |
| 6,564,378 B1 | 5/2003 | Satterfield et al. |
| 6,570,555 B1 | 5/2003 | Prevost et al. |
| 6,577,735 B1 | 6/2003 | Bharat |
| 6,611,654 B1 | 8/2003 | Shteyn |
| 6,614,987 B1 | 9/2003 | Ismail et al. |
| 6,633,294 B1 | 10/2003 | Rosenthal et al. |
| 6,640,202 B1 | 10/2003 | Dietz et al. |
| 6,647,417 B1 | 11/2003 | Hunter et al. |
| 6,651,253 B2 | 11/2003 | Dudkiewicz et al. |
| 6,657,116 B1 | 12/2003 | Gunnerson |
| 6,661,918 B1 | 12/2003 | Gordon et al. |
| 6,671,882 B1 | 12/2003 | Murphy et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,741,617 B2 | 5/2004 | Rosengren et al. |
| 6,751,402 B2 | 6/2004 | Elliott et al. |
| 6,756,997 B1 | 6/2004 | Ward, III et al. |
| 6,760,412 B1 | 7/2004 | Loucks |
| 6,760,537 B2 | 7/2004 | Mankovitz |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,813,775 B1 | 11/2004 | Finseth et al. |
| 6,813,777 B1 | 11/2004 | Weinberger et al. |
| 6,816,175 B1 | 11/2004 | Hamp et al. |
| 6,816,904 B1 | 11/2004 | Ludwig et al. |
| 6,820,278 B1 | 11/2004 | Ellis |
| 6,826,512 B2 | 11/2004 | Dara-Abrams et al. |
| 6,837,789 B2 | 1/2005 | Garahi et al. |
| 6,839,769 B2 | 1/2005 | Needham et al. |
| 6,868,225 B1 | 3/2005 | Brown et al. |
| 6,873,710 B1 | 3/2005 | Cohen-Solal et al. |
| 6,873,723 B1 | 3/2005 | Aucsmith et al. |
| 6,876,496 B2 | 4/2005 | French et al. |
| 6,882,793 B1 | 4/2005 | Fu et al. |
| 6,897,904 B2 | 5/2005 | Potrebic et al. |
| 6,901,603 B2 | 5/2005 | Ziedler et al. |
| 6,931,593 B1 | 8/2005 | Grooters |
| 6,937,742 B2 | 8/2005 | Roberts et al. |
| 6,938,101 B2 | 8/2005 | Hayes et al. |
| 6,950,534 B2 | 9/2005 | Cohen et al. |
| 6,950,624 B2 | 9/2005 | Kim et al. |
| 6,972,680 B2 | 12/2005 | Yui et al. |
| 6,973,474 B2 | 12/2005 | Hatayama |
| 7,003,134 B1 | 2/2006 | Covell et al. |
| 7,003,791 B2 | 2/2006 | Mizutani |
| 7,013,478 B1 | 3/2006 | Hendricks et al. |
| 7,020,704 B1 | 3/2006 | Lipscomb et al. |
| 7,028,269 B1 | 4/2006 | Cohen-Solal et al. |
| 7,036,094 B1 | 4/2006 | Cohen et al. |
| 7,038,855 B2 | 5/2006 | French et al. |
| 7,039,643 B2 | 5/2006 | Sena et al. |
| 7,039,676 B1 | 5/2006 | Day et al. |
| 7,042,440 B2 | 5/2006 | Pryor et al. |
| 7,047,377 B2 | 5/2006 | Elder et al. |
| 7,050,606 B2 | 5/2006 | Paul et al. |
| 7,055,166 B1 | 5/2006 | Logan et al. |
| 7,058,204 B2 | 6/2006 | Hildreth et al. |
| 7,058,635 B1 | 6/2006 | Shah-Nazaroff et al. |
| 7,060,957 B2 | 6/2006 | Lange et al. |
| 7,086,077 B2 | 8/2006 | Giammaressi |
| 7,088,952 B2 | 8/2006 | Saito et al. |
| 7,098,958 B2 | 8/2006 | Wredenhagen et al. |
| 7,103,906 B1 | 9/2006 | Katz et al. |
| 7,113,918 B1 | 9/2006 | Ahmad et al. |
| 7,120,925 B2 | 10/2006 | D'Souza et al. |
| 7,121,946 B2 | 10/2006 | Paul et al. |
| 7,134,130 B1 | 11/2006 | Thomas |
| 7,143,432 B1 | 11/2006 | Brooks et al. |
| 7,159,235 B2 | 1/2007 | Son et al. |
| 7,165,098 B1 | 1/2007 | Boyer et al. |
| 7,170,492 B2 | 1/2007 | Bell |
| 7,178,161 B1 | 2/2007 | Fristoe et al. |
| 7,184,048 B2 | 2/2007 | Hunter |
| 7,200,852 B1 | 4/2007 | Block |
| 7,202,898 B1 | 4/2007 | Braun et al. |
| 7,206,892 B2 | 4/2007 | Kim et al. |
| 7,213,071 B2 | 5/2007 | DeLima et al. |
| 7,213,089 B2 | 5/2007 | Hatakenaka |
| 7,222,078 B2 | 5/2007 | Abelow |
| 7,224,889 B2 | 5/2007 | Takasu et al. |
| 7,227,526 B2 | 6/2007 | Hildreth et al. |
| 7,231,175 B2 | 6/2007 | Ellis |
| 7,237,253 B1 | 6/2007 | Blackketter et al. |
| 7,240,356 B2 | 7/2007 | Iki et al. |
| 7,248,778 B1 | 7/2007 | Anderson et al. |
| 7,259,747 B2 | 8/2007 | Bell |
| 7,260,461 B2 | 8/2007 | Rao et al. |
| 7,268,833 B2 | 9/2007 | Park et al. |
| 7,269,733 B1 | 9/2007 | O'Toole, Jr. |
| 7,296,284 B1 | 11/2007 | Price et al. |
| 7,308,112 B2 | 12/2007 | Fujimura et al. |
| 7,317,836 B2 | 1/2008 | Fujimura et al. |
| 7,340,490 B2 | 3/2008 | Teloh et al. |
| 7,344,084 B2 | 3/2008 | DaCosta |
| 7,346,920 B2 | 3/2008 | Lamkin et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,386,871 B1 | 6/2008 | Knudson et al. |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,428,744 B1 | 9/2008 | Ritter et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,458,093 B2 | 11/2008 | Dukes et al. |
| 7,460,690 B2 | 12/2008 | Cohen et al. |
| 7,483,964 B1 | 1/2009 | Jackson et al. |
| 7,489,812 B2 | 2/2009 | Fox et al. |
| 7,518,503 B2 | 4/2009 | Peele |
| 7,536,032 B2 | 5/2009 | Bell |
| 7,536,704 B2 | 5/2009 | Pierre et al. |
| 7,555,142 B2 | 6/2009 | Hildreth et al. |
| 7,560,701 B2 | 7/2009 | Oggier et al. |
| 7,570,805 B2 | 8/2009 | Gu |

(56) References Cited

U.S. PATENT DOCUMENTS

| | | |
|---|---|---|
| 7,574,020 B2 | 8/2009 | Shamaie |
| 7,574,723 B2 | 8/2009 | Putterman et al. |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,603,685 B2 | 10/2009 | Knudson et al. |
| 7,607,509 B2 | 10/2009 | Schmiz et al. |
| 7,620,202 B2 | 11/2009 | Fujimura et al. |
| 7,624,337 B2 | 11/2009 | Sull et al. |
| 7,624,416 B1 | 11/2009 | Vandermolen et al. |
| 7,650,621 B2 | 1/2010 | Thomas et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,684,673 B2 | 3/2010 | Monroe |
| 7,689,510 B2 | 3/2010 | Lamkin et al. |
| 7,689,556 B2 | 3/2010 | Garg et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,783,632 B2 | 8/2010 | Richardson et al. |
| 7,809,167 B2 | 10/2010 | Bell |
| 7,834,846 B1 | 11/2010 | Bell |
| 7,840,977 B2 | 11/2010 | Walker |
| 7,852,262 B2 | 12/2010 | Namineni et al. |
| 7,852,416 B2 | 12/2010 | Bennett et al. |
| RE42,256 E | 3/2011 | Edwards |
| 7,898,522 B2 | 3/2011 | Hildreth et al. |
| 7,907,213 B1 | 3/2011 | Biere et al. |
| 7,917,933 B2 | 3/2011 | Thomas et al. |
| 7,929,551 B2 | 4/2011 | Dietrich |
| 8,029,359 B2 | 10/2011 | Cheng |
| 8,035,612 B2 | 10/2011 | Bell et al. |
| 8,035,614 B2 | 10/2011 | Bell et al. |
| 8,035,624 B2 | 10/2011 | Bell et al. |
| 8,060,399 B2 | 11/2011 | Ullah |
| 8,072,470 B2 | 12/2011 | Marks |
| 8,104,066 B2 | 1/2012 | Colsey et al. |
| 8,122,491 B2 | 2/2012 | Yee et al. |
| 8,266,666 B2 | 9/2012 | Friedman |
| 8,331,987 B2 | 12/2012 | Rosenblatt |
| 8,539,357 B2 | 9/2013 | Hildreth |
| 8,601,526 B2 | 12/2013 | Nishimura et al. |
| 8,667,519 B2 | 3/2014 | Small et al. |
| 8,791,787 B2 * | 7/2014 | Hardacker et al. ............ 340/5.1 |
| 2001/0004338 A1 | 6/2001 | Yankowski |
| 2001/0007147 A1 | 7/2001 | Goldschmidt Iki et al. |
| 2001/0026287 A1 | 10/2001 | Watanabe |
| 2001/0039660 A1 | 11/2001 | Vasilevsky et al. |
| 2001/0042107 A1 | 11/2001 | Palm |
| 2001/0043700 A1 | 11/2001 | Shima et al. |
| 2001/0044726 A1 | 11/2001 | Li et al. |
| 2002/0010652 A1 | 1/2002 | Deguchi |
| 2002/0032907 A1 | 3/2002 | Daniels |
| 2002/0043700 A1 | 4/2002 | Sasaki et al. |
| 2002/0046315 A1 | 4/2002 | Miller et al. |
| 2002/0056087 A1 | 5/2002 | Berezowski et al. |
| 2002/0056119 A1 | 5/2002 | Moynihan |
| 2002/0059588 A1 | 5/2002 | Huber et al. |
| 2002/0059610 A1 | 5/2002 | Ellis |
| 2002/0059642 A1 | 5/2002 | Russ et al. |
| 2002/0062481 A1 | 5/2002 | Slaney et al. |
| 2002/0069218 A1 | 6/2002 | Sull et al. |
| 2002/0069746 A1 | 6/2002 | Taira et al. |
| 2002/0070982 A1 | 6/2002 | Hill et al. |
| 2002/0075402 A1 | 6/2002 | Robson et al. |
| 2002/0078293 A1 | 6/2002 | Kou et al. |
| 2002/0078453 A1 | 6/2002 | Kuo |
| 2002/0082901 A1 | 6/2002 | Dunning et al. |
| 2002/0087588 A1 | 7/2002 | McBride et al. |
| 2002/0088011 A1 | 7/2002 | Lamkin et al. |
| 2002/0090203 A1 | 7/2002 | Mankovitz |
| 2002/0091568 A1 | 7/2002 | Kraft et al. |
| 2002/0104091 A1 | 8/2002 | Prabhu et al. |
| 2002/0113824 A1 | 8/2002 | Myers, Jr. |
| 2002/0120935 A1 | 8/2002 | Huber et al. |
| 2002/0157099 A1 | 10/2002 | Schrader et al. |
| 2002/0161579 A1 | 10/2002 | Saindon et al. |
| 2002/0165751 A1 | 11/2002 | Upadhya |
| 2002/0165770 A1 | 11/2002 | Khoo et al. |
| 2002/0166123 A1 | 11/2002 | Schrader et al. |
| 2002/0174430 A1 | 11/2002 | Ellis et al. |
| 2002/0174444 A1 | 11/2002 | Gatto et al. |
| 2002/0180803 A1 | 12/2002 | Kaplan et al. |
| 2002/0188735 A1 | 12/2002 | Needham et al. |
| 2002/0194011 A1 | 12/2002 | Boies et al. |
| 2002/0194586 A1 | 12/2002 | Gutta et al. |
| 2002/0194600 A1 | 12/2002 | Ellis et al. |
| 2003/0005440 A1 | 1/2003 | Axelsson et al. |
| 2003/0005446 A1 | 1/2003 | Jaff et al. |
| 2003/0026592 A1 | 2/2003 | Kawahara et al. |
| 2003/0035404 A1 | 2/2003 | Ozluturk et al. |
| 2003/0046437 A1 | 3/2003 | Eytchison et al. |
| 2003/0066084 A1 | 4/2003 | Kaars |
| 2003/0066085 A1 | 4/2003 | Boyer et al. |
| 2003/0066092 A1 | 4/2003 | Wagner |
| 2003/0068154 A1 | 4/2003 | Zylka |
| 2003/0070177 A1 | 4/2003 | Kondo et al. |
| 2003/0078784 A1 | 4/2003 | Jordan et al. |
| 2003/0093803 A1 | 5/2003 | Ishikawa et al. |
| 2003/0097408 A1 | 5/2003 | Kageyama et al. |
| 2003/0105813 A1 | 6/2003 | Mizutani |
| 2003/0110499 A1 | 6/2003 | Knudson et al. |
| 2003/0135860 A1 | 7/2003 | Dureau |
| 2003/0140343 A1 | 7/2003 | Falvo et al. |
| 2003/0149621 A1 | 8/2003 | Shteyn |
| 2003/0149980 A1 | 8/2003 | Ellis |
| 2003/0149988 A1 | 8/2003 | Ellis et al. |
| 2003/0152096 A1 | 8/2003 | Chapman |
| 2003/0156134 A1 | 8/2003 | Kim |
| 2003/0162096 A1 | 8/2003 | Michot et al. |
| 2003/0163813 A1 | 8/2003 | Klosterman et al. |
| 2003/0163832 A1 | 8/2003 | Tsuria et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0194260 A1 | 10/2003 | Ward et al. |
| 2003/0196201 A1 | 10/2003 | Schein et al. |
| 2003/0206710 A1 | 11/2003 | Ferman et al. |
| 2003/0208756 A1 | 11/2003 | Macrae et al. |
| 2003/0214955 A1 | 11/2003 | Kim |
| 2003/0237093 A1 | 12/2003 | Marsh |
| 2004/0008972 A1 | 1/2004 | Haken |
| 2004/0023810 A1 | 2/2004 | Ignatiev et al. |
| 2004/0064835 A1 | 4/2004 | Bellwood et al. |
| 2004/0070491 A1 | 4/2004 | Huang et al. |
| 2004/0088731 A1 | 5/2004 | Putterman et al. |
| 2004/0100088 A1 | 5/2004 | Tellenbach et al. |
| 2004/0103434 A1 | 5/2004 | Ellis |
| 2004/0104806 A1 | 6/2004 | Yui et al. |
| 2004/0117831 A1 | 6/2004 | Ellis et al. |
| 2004/0128686 A1 | 7/2004 | Boyer et al. |
| 2004/0139233 A1 | 7/2004 | Kellerman et al. |
| 2004/0156614 A1 | 8/2004 | Bumgardner et al. |
| 2004/0177370 A1 | 9/2004 | Dudkiewicz |
| 2004/0181814 A1 | 9/2004 | Ellis et al. |
| 2004/0184763 A1 | 9/2004 | DiFrancesco |
| 2004/0193425 A1 | 9/2004 | Tomes |
| 2004/0193648 A1 | 9/2004 | Lai et al. |
| 2004/0210926 A1 | 10/2004 | Francis et al. |
| 2004/0210932 A1 | 10/2004 | Mori et al. |
| 2004/0220091 A1 | 11/2004 | Adam et al. |
| 2004/0226034 A1 | 11/2004 | Kaczowka et al. |
| 2004/0237104 A1 | 11/2004 | Cooper et al. |
| 2004/0255326 A1 | 12/2004 | Hicks, III et al. |
| 2004/0259537 A1 | 12/2004 | Ackley |
| 2004/0267965 A1 | 12/2004 | Vasudevan et al. |
| 2004/0268403 A1 | 12/2004 | Krieger et al. |

(56) References Cited

U.S. PATENT DOCUMENTS

| | | |
|---|---|---|
| 2005/0021397 A1 | 1/2005 | Cui et al. |
| 2005/0028208 A1 | 2/2005 | Ellis et al. |
| 2005/0039208 A1 | 2/2005 | Veeck et al. |
| 2005/0071876 A1 | 3/2005 | van Beek |
| 2005/0091680 A1 | 4/2005 | Kondo |
| 2005/0102324 A1 | 5/2005 | Spring et al. |
| 2005/0120373 A1 | 6/2005 | Thomas et al. |
| 2005/0125718 A1 | 6/2005 | Van Doorn |
| 2005/0132264 A1 | 6/2005 | Joshi et al. |
| 2005/0138137 A1 | 6/2005 | Encarnacion et al. |
| 2005/0138658 A1 | 6/2005 | Bryan |
| 2005/0138660 A1 | 6/2005 | Boyer et al. |
| 2005/0149966 A1 | 7/2005 | Fairhurst et al. |
| 2005/0160461 A1 | 7/2005 | Baumgartner et al. |
| 2005/0204381 A1 | 9/2005 | Ludvig et al. |
| 2005/0204388 A1 | 9/2005 | Knudson et al. |
| 2005/0227611 A1 | 10/2005 | Ellis |
| 2005/0246393 A1 | 11/2005 | Coates et al. |
| 2005/0246746 A1 | 11/2005 | Yui et al. |
| 2005/0251827 A1 | 11/2005 | Ellis et al. |
| 2005/0259963 A1 | 11/2005 | Sano et al. |
| 2005/0285966 A1 | 12/2005 | Bamji et al. |
| 2006/0004685 A1 | 1/2006 | Pyhalammi et al. |
| 2006/0007479 A1 | 1/2006 | Henry et al. |
| 2006/0015888 A1 | 1/2006 | Shih |
| 2006/0026635 A1 | 2/2006 | Potrebic et al. |
| 2006/0026665 A1 | 2/2006 | Rodriguez et al. |
| 2006/0031883 A1 | 2/2006 | Ellis et al. |
| 2006/0037054 A1 | 2/2006 | McDowell et al. |
| 2006/0053449 A1 | 3/2006 | Gutta |
| 2006/0064728 A1 | 3/2006 | Son et al. |
| 2006/0080707 A1 | 4/2006 | Laksono |
| 2006/0083301 A1 | 4/2006 | Nishio |
| 2006/0085835 A1 | 4/2006 | Istvan et al. |
| 2006/0095942 A1 | 5/2006 | van Beek |
| 2006/0098221 A1 | 5/2006 | Ferlitsch |
| 2006/0101492 A1 | 5/2006 | Lowcock |
| 2006/0173838 A1 | 8/2006 | Garg et al. |
| 2006/0190978 A1 | 8/2006 | Russ et al. |
| 2006/0212900 A1 | 9/2006 | Ismail et al. |
| 2006/0215650 A1 | 9/2006 | Wollmershauser et al. |
| 2006/0218573 A1 | 9/2006 | Proebstel |
| 2006/0218604 A1 | 9/2006 | Riedl et al. |
| 2006/0238648 A1 | 10/2006 | Wogsberg |
| 2006/0248570 A1 | 11/2006 | Witwer |
| 2006/0253874 A1 | 11/2006 | Stark et al. |
| 2006/0259949 A1 | 11/2006 | Schaefer et al. |
| 2006/0263758 A1 | 11/2006 | Crutchfield et al. |
| 2006/0265427 A1 | 11/2006 | Cohen et al. |
| 2006/0271953 A1 | 11/2006 | Jacoby et al. |
| 2006/0277579 A1 | 12/2006 | Inkinen |
| 2006/0294574 A1 | 12/2006 | Cha |
| 2007/0011709 A1 | 1/2007 | Katz et al. |
| 2007/0022442 A1 | 1/2007 | Gil et al. |
| 2007/0028267 A1 | 2/2007 | Ostojic et al. |
| 2007/0033607 A1 | 2/2007 | Bryan |
| 2007/0036303 A1 | 2/2007 | Lee et al. |
| 2007/0050242 A1 | 3/2007 | Kralik |
| 2007/0055980 A1 | 3/2007 | Megeid et al. |
| 2007/0055989 A1 | 3/2007 | Shanks et al. |
| 2007/0061022 A1 | 3/2007 | Hoffberg-Borghesani et al. |
| 2007/0074245 A1 | 3/2007 | Nyako et al. |
| 2007/0076665 A1 | 4/2007 | Nair et al. |
| 2007/0078708 A1 | 4/2007 | Yu et al. |
| 2007/0078709 A1 | 4/2007 | Rajaram |
| 2007/0089132 A1 | 4/2007 | Qureshey et al. |
| 2007/0089160 A1 | 4/2007 | Ando |
| 2007/0094702 A1 | 4/2007 | Khare et al. |
| 2007/0100690 A1 | 5/2007 | Hopkins |
| 2007/0113246 A1 | 5/2007 | Xiong |
| 2007/0124781 A1 | 5/2007 | Casey et al. |
| 2007/0130089 A1 | 6/2007 | Chiu |
| 2007/0130283 A1 | 6/2007 | Klein et al. |
| 2007/0147351 A1 | 6/2007 | Dietrich et al. |
| 2007/0157234 A1 | 7/2007 | Walker |
| 2007/0157237 A1 | 7/2007 | Cordray et al. |
| 2007/0157240 A1 | 7/2007 | Walker |
| 2007/0157241 A1 | 7/2007 | Walker |
| 2007/0157242 A1 | 7/2007 | Cordray et al. |
| 2007/0157260 A1 | 7/2007 | Walker |
| 2007/0157266 A1 | 7/2007 | Ellis et al. |
| 2007/0161402 A1 | 7/2007 | Ng et al. |
| 2007/0162661 A1 | 7/2007 | Fu et al. |
| 2007/0162850 A1 | 7/2007 | Adler et al. |
| 2007/0167689 A1 | 7/2007 | Ramadas et al. |
| 2007/0171286 A1 | 7/2007 | Ishii et al. |
| 2007/0174774 A1 | 7/2007 | Lerman et al. |
| 2007/0186240 A1 | 8/2007 | Ward et al. |
| 2007/0198659 A1 | 8/2007 | Lam |
| 2007/0214471 A1 | 9/2007 | Rosenberg |
| 2007/0214489 A1 | 9/2007 | Kwong et al. |
| 2007/0220024 A1 | 9/2007 | Putterman et al. |
| 2007/0220580 A1 | 9/2007 | Putterman et al. |
| 2007/0229300 A1* | 10/2007 | Masato .......... G08C 23/04 340/12.22 |
| 2007/0243930 A1 | 10/2007 | Zalewski et al. |
| 2007/0282969 A1 | 12/2007 | Dietrich et al. |
| 2007/0283046 A1 | 12/2007 | Dietrich et al. |
| 2007/0283395 A1 | 12/2007 | Wezowski |
| 2008/0004959 A1 | 1/2008 | Tunguz-Zawislak et al. |
| 2008/0026838 A1 | 1/2008 | Dunstan et al. |
| 2008/0030621 A1 | 2/2008 | Ciudad et al. |
| 2008/0033826 A1 | 2/2008 | Maislos et al. |
| 2008/0046930 A1 | 2/2008 | Smith et al. |
| 2008/0046935 A1 | 2/2008 | Krakirian |
| 2008/0059988 A1 | 3/2008 | Lee et al. |
| 2008/0060001 A1 | 3/2008 | Logan et al. |
| 2008/0074546 A1 | 3/2008 | Momen |
| 2008/0077952 A1 | 3/2008 | St. Jean et al. |
| 2008/0077965 A1 | 3/2008 | Kamimaki et al. |
| 2008/0102947 A1 | 5/2008 | Hays et al. |
| 2008/0120112 A1 | 5/2008 | Jordan et al. |
| 2008/0120668 A1 | 5/2008 | Yau |
| 2008/0126919 A1 | 5/2008 | Uskali et al. |
| 2008/0127253 A1 | 5/2008 | Zhang et al. |
| 2008/0130951 A1 | 6/2008 | Wren et al. |
| 2008/0134256 A1 | 6/2008 | DaCosta |
| 2008/0147501 A1 | 6/2008 | Gilliam |
| 2008/0155585 A1 | 6/2008 | Craner et al. |
| 2008/0169929 A1 | 7/2008 | Albertson et al. |
| 2008/0184294 A1 | 7/2008 | Lemmons et al. |
| 2008/0196068 A1 | 8/2008 | Tseng |
| 2008/0204450 A1 | 8/2008 | Dawson et al. |
| 2008/0262909 A1 | 10/2008 | Li et al. |
| 2008/0263227 A1 | 10/2008 | Roberts et al. |
| 2008/0278635 A1* | 11/2008 | Hardacker .......... H04N 5/44582 348/734 |
| 2008/0282288 A1 | 11/2008 | Heo |
| 2008/0300985 A1 | 12/2008 | Shamp et al. |
| 2008/0301729 A1 | 12/2008 | Broos et al. |
| 2009/0019492 A1 | 1/2009 | Grasset |
| 2009/0025024 A1 | 1/2009 | Beser et al. |
| 2009/0052859 A1 | 2/2009 | Greenberger et al. |
| 2009/0059175 A1 | 3/2009 | Le Quesne et al. |
| 2009/0087039 A1 | 4/2009 | Matsuura |
| 2009/0118002 A1 | 5/2009 | Lyons et al. |
| 2009/0125971 A1 | 5/2009 | Belz et al. |
| 2009/0133051 A1* | 5/2009 | Hildreth .......... H04N 5/4403 725/28 |
| 2009/0138805 A1* | 5/2009 | Hildreth .......... G06K 9/00335 715/745 |
| 2009/0150925 A1 | 6/2009 | Henderson |
| 2009/0158170 A1 | 6/2009 | Narayanan et al. |
| 2009/0163139 A1 | 6/2009 | Wright-Riley |
| 2009/0165046 A1 | 6/2009 | Stallings et al. |
| 2009/0174658 A1 | 7/2009 | Blatchley et al. |
| 2009/0183208 A1 | 7/2009 | Christensen et al. |
| 2009/0192874 A1 | 7/2009 | Powles et al. |
| 2009/0195392 A1 | 8/2009 | Zalewski |
| 2009/0199235 A1 | 8/2009 | Surendran et al. |
| 2009/0210898 A1 | 8/2009 | Childress et al. |
| 2009/0217315 A1 | 8/2009 | Malik et al. |
| 2009/0217335 A1 | 8/2009 | Wong et al. |
| 2009/0222874 A1 | 9/2009 | White et al. |

(56) References Cited

U.S. PATENT DOCUMENTS

| | | |
|---|---|---|
| 2009/0248505 A1 | 10/2009 | Finkelstein et al. |
| 2009/0248914 A1 | 10/2009 | Choi et al. |
| 2009/0249391 A1 | 10/2009 | Klein et al. |
| 2009/0271829 A1 | 10/2009 | Larsson et al. |
| 2009/0288131 A1 | 11/2009 | Kandekar et al. |
| 2009/0288132 A1 | 11/2009 | Hegde |
| 2009/0292671 A1 | 11/2009 | Ramig et al. |
| 2009/0298535 A1 | 12/2009 | Klein et al. |
| 2009/0299843 A1 | 12/2009 | Shkedi |
| 2009/0300144 A1 | 12/2009 | Marr et al. |
| 2009/0313658 A1 | 12/2009 | Nishimura et al. |
| 2009/0325661 A1 | 12/2009 | Gross |
| 2009/0327073 A1 | 12/2009 | Li et al. |
| 2009/0328087 A1 | 12/2009 | Higgins et al. |
| 2010/0053458 A1 | 3/2010 | Anglin et al. |
| 2010/0070987 A1 | 3/2010 | Amento et al. |
| 2010/0086204 A1 | 4/2010 | Lessing |
| 2010/0107046 A1 | 4/2010 | Kang et al. |
| 2010/0107194 A1 | 4/2010 | McKissick et al. |
| 2010/0145797 A1 | 6/2010 | Hamilton, II et al. |
| 2010/0146445 A1 | 6/2010 | Kraut |
| 2010/0146560 A1 | 6/2010 | Bonfrer |
| 2010/0146573 A1 | 6/2010 | Richardson et al. |
| 2010/0154021 A1 | 6/2010 | Howarter et al. |
| 2010/0169072 A1 | 7/2010 | Zaki et al. |
| 2010/0177751 A1 | 7/2010 | Fischer et al. |
| 2010/0199313 A1 | 8/2010 | Rhim |
| 2010/0205562 A1 | 8/2010 | de Heer |
| 2010/0262987 A1 | 10/2010 | Imanilov |
| 2010/0269145 A1 | 10/2010 | Ingrassia et al. |
| 2010/0310234 A1 | 12/2010 | Sigvaldason |
| 2011/0016492 A1 | 1/2011 | Morita |
| 2011/0026384 A1 | 2/2011 | Ryu |
| 2011/0029922 A1 | 2/2011 | Hoffberg et al. |
| 2011/0069940 A1 | 3/2011 | Shimy et al. |
| 2011/0070819 A1 | 3/2011 | Shimy et al. |
| 2011/0072452 A1 | 3/2011 | Shimy et al. |
| 2011/0078731 A1 | 3/2011 | Nishimura |
| 2011/0106375 A1 | 5/2011 | Gurusamy Sundaram |
| 2011/0107388 A1 | 5/2011 | Lee et al. |
| 2011/0131607 A1 | 6/2011 | Thomas et al. |
| 2011/0134320 A1 | 6/2011 | Daly |
| 2011/0157368 A1 | 6/2011 | Jo |
| 2011/0163939 A1 | 7/2011 | Tam et al. |
| 2011/0164175 A1 | 7/2011 | Chung et al. |
| 2011/0167447 A1 | 7/2011 | Wong |
| 2011/0184945 A1 | 7/2011 | Das et al. |
| 2011/0185392 A1 | 7/2011 | Walker |
| 2011/0258211 A1 | 10/2011 | Kalisky et al. |
| 2011/0309933 A1 | 12/2011 | Marino |
| 2012/0008917 A1 | 1/2012 | Katz et al. |
| 2012/0011226 A1 | 1/2012 | Katz et al. |
| 2012/0011454 A1 | 1/2012 | Droz et al. |
| 2012/0047166 A1 | 2/2012 | Katz et al. |
| 2012/0072964 A1 | 3/2012 | Walter et al. |
| 2012/0077574 A1 | 3/2012 | Walker et al. |
| 2012/0105720 A1 | 5/2012 | Chung et al. |
| 2012/0114303 A1 | 5/2012 | Chung et al. |
| 2012/0150650 A1 | 6/2012 | Zahand |
| 2012/0327123 A1 | 12/2012 | Felt |
| 2013/0047189 A1 | 2/2013 | Raveendran et al. |
| 2013/0191875 A1 | 7/2013 | Morris et al. |
| 2014/0002619 A1* | 1/2014 | Morohoshi ............... 348/51 |
| 2014/0250447 A1 | 9/2014 | Schink |
| 2014/0375752 A1* | 12/2014 | Shoemake et al. ........ 348/14.07 |

FOREIGN PATENT DOCUMENTS

| | | |
|---|---|---|
| DE | 31 51 492 | 7/1983 |
| DE | 195 31 121 | 2/1997 |
| DE | 197 40 079 | 3/1999 |
| EP | 0 424 469 | 5/1991 |
| EP | 2 256 115 | 11/1992 |
| EP | 0 535 749 | 4/1993 |
| EP | 0 572 090 | 12/1993 |
| EP | 0 583 061 A1 | 2/1994 |
| EP | 0 605 115 | 7/1994 |
| EP | 0 624 039 | 11/1994 |
| EP | 0 662 771 | 7/1995 |
| EP | 0 682 452 | 11/1995 |
| EP | 0 711 076 | 5/1996 |
| EP | 0 725 539 | 8/1996 |
| EP | 0 753 964 | 1/1997 |
| EP | 0 758 833 | 2/1997 |
| EP | 0 762 756 | 3/1997 |
| EP | 0 763 938 | 3/1997 |
| EP | 0 774 853 | 5/1997 |
| EP | 0 793 225 | 9/1997 |
| EP | 0 805 594 A2 | 11/1997 |
| EP | 0 854 645 | 7/1998 |
| EP | 0 673 160 | 8/1998 |
| EP | 0 874 524 | 10/1998 |
| EP | 0 924 927 | 6/1999 |
| EP | 0 932 275 | 7/1999 |
| EP | 0 940 985 | 9/1999 |
| EP | 0 944 253 | 9/1999 |
| EP | 0 944 257 | 9/1999 |
| EP | 0 986 046 | 3/2000 |
| EP | 1 217 787 | 6/2002 |
| EP | 1 363 452 A1 | 11/2003 |
| EP | 1 427 148 | 6/2006 |
| EP | 2 129 113 A1 | 12/2009 |
| EP | 2 154 882 A1 | 2/2010 |
| EP | 2 299 711 A1 | 3/2011 |
| EP | 2 325 670 A1 | 5/2011 |
| GB | 2 256 115 | 11/1992 |
| GB | 2 265 792 | 10/1993 |
| GB | 2 458 727 A | 10/2009 |
| JP | 60-061935 | 9/1985 |
| JP | 03-022770 | 1/1991 |
| JP | 06111413 | 4/1994 |
| JP | 07-336318 | 12/1995 |
| JP | 08-056352 | 2/1996 |
| JP | 08044490 | 2/1996 |
| JP | 09-102827 A | 4/1997 |
| JP | 09-214873 | 8/1997 |
| JP | 10-65978 | 3/1998 |
| JP | 11 032272 | 2/1999 |
| JP | 11-177962 | 7/1999 |
| JP | 11-205711 | 7/1999 |
| JP | 11-341040 | 12/1999 |
| JP | 2000-004272 | 1/2000 |
| JP | 2001084662 A | 3/2001 |
| JP | 2002153684 A | 5/2002 |
| JP | 2003162444 | 6/2003 |
| JP | 2003209893 | 7/2003 |
| JP | 2004080382 A | 3/2004 |
| JP | 2004215126 A | 7/2004 |
| JP | 2004304372 A | 10/2004 |
| JP | 2005150831 A | 6/2005 |
| JP | 2006101261 A | 4/2006 |
| JP | 2006324809 A | 11/2006 |
| JP | 2007036911 A | 2/2007 |
| JP | 2007081719 A | 3/2007 |
| JP | 2007524316 A | 8/2007 |
| JP | 2007274246 A | 10/2007 |
| JP | 2008035533 A | 2/2008 |
| JP | 2008079039 A | 4/2008 |
| JP | 2009060487 A | 3/2009 |
| JP | 2009081877 A | 4/2009 |
| JP | 2009111817 A | 5/2009 |
| JP | 2009130866 A | 6/2009 |
| JP | 2009164655 A | 7/2009 |
| JP | 2010510696 A | 4/2010 |
| KR | 1999-0086454 | 12/1999 |
| KR | 20090064814 A | 6/2009 |
| KR | 20100076498 | 7/2010 |
| RO | 247388 | 10/1994 |
| WO | WO-87/03766 A1 | 6/1987 |
| WO | WO-88/04507 | 6/1988 |
| WO | WO-89/03085 A1 | 4/1989 |
| WO | WO-89/12370 | 12/1989 |
| WO | WO-90/00847 | 1/1990 |
| WO | WO-91/00670 | 1/1991 |

(56) References Cited

FOREIGN PATENT DOCUMENTS

| | | |
|---|---|---|
| WO | WO-91/07050 | 5/1991 |
| WO | WO-92/04801 | 3/1992 |
| WO | WO-93/08542 | 4/1993 |
| WO | WO-93/10708 A1 | 6/1993 |
| WO | WO-93/22877 | 11/1993 |
| WO | WO-94/14282 A1 | 6/1994 |
| WO | WO-95/01056 A1 | 1/1995 |
| WO | WO-95/01058 | 1/1995 |
| WO | WO-95/01059 A1 | 1/1995 |
| WO | WO-95/04431 | 2/1995 |
| WO | WO-95/10910 A2 | 4/1995 |
| WO | WO-95/15658 | 6/1995 |
| WO | WO-95/28055 A1 | 10/1995 |
| WO | WO-95/31069 | 11/1995 |
| WO | WO-95/32583 | 11/1995 |
| WO | WO-95/32584 | 11/1995 |
| WO | WO-95/32585 A1 | 11/1995 |
| WO | WO-95/32587 | 11/1995 |
| WO | WO-96/07270 A1 | 3/1996 |
| WO | WO-96/09721 | 3/1996 |
| WO | WO-96/13932 A1 | 5/1996 |
| WO | WO-96/17467 | 6/1996 |
| WO | WO-96/20555 A1 | 7/1996 |
| WO | WO-96/25821 | 8/1996 |
| WO | WO-96/31980 | 10/1996 |
| WO | WO-96/33572 | 10/1996 |
| WO | WO-96/34467 | 10/1996 |
| WO | WO-96/34491 | 10/1996 |
| WO | WO-96/41472 | 12/1996 |
| WO | WO-96/41478 | 12/1996 |
| WO | WO-97/13368 A1 | 4/1997 |
| WO | WO-97/17598 A1 | 5/1997 |
| WO | WO-97/21291 | 6/1997 |
| WO | WO-97/31480 A1 | 8/1997 |
| WO | WO-97/32434 | 9/1997 |
| WO | WO-97/34413 | 9/1997 |
| WO | WO-97/34414 | 9/1997 |
| WO | WO-97/36422 A1 | 10/1997 |
| WO | WO-97/37500 | 10/1997 |
| WO | WO-97/42763 | 11/1997 |
| WO | WO-97/46016 | 12/1997 |
| WO | WO-97/46943 | 12/1997 |
| WO | WO-97/47106 A1 | 12/1997 |
| WO | WO-97/47124 | 12/1997 |
| WO | WO-97/47143 A2 | 12/1997 |
| WO | WO-97/48228 | 12/1997 |
| WO | WO-97/49237 A1 | 12/1997 |
| WO | WO-97/50251 A1 | 12/1997 |
| WO | WO-98/01995 | 1/1998 |
| WO | WO-98/07277 | 2/1998 |
| WO | WO-98/10589 A1 | 3/1998 |
| WO | WO-98/12872 | 3/1998 |
| WO | WO-98/16062 A1 | 4/1998 |
| WO | WO-98/17033 | 4/1998 |
| WO | WO-98/17064 A1 | 4/1998 |
| WO | WO-98/18260 | 4/1998 |
| WO | WO-98/19459 | 5/1998 |
| WO | WO-98/26528 | 6/1998 |
| WO | WO-98/26584 A1 | 6/1998 |
| WO | WO-98/26596 | 6/1998 |
| WO | WO-98/31115 | 7/1998 |
| WO | WO-98/31116 | 7/1998 |
| WO | WO-98/34405 | 8/1998 |
| WO | WO-98/38831 | 9/1998 |
| WO | WO-98/47279 | 10/1998 |
| WO | WO-98/47283 | 10/1998 |
| WO | WO-98/48566 | 10/1998 |
| WO | WO-98/53611 | 11/1998 |
| WO | WO-99/03267 | 1/1999 |
| WO | WO-99/04561 | 1/1999 |
| WO | WO-99/11060 | 3/1999 |
| WO | WO-99/12320 | 3/1999 |
| WO | WO-99/14945 | 3/1999 |
| WO | WO-99/14947 A1 | 3/1999 |
| WO | WO-99/27681 | 6/1999 |
| WO | WO-99/28897 | 6/1999 |
| WO | WO-99/30491 A1 | 6/1999 |
| WO | WO-99/35753 | 7/1999 |
| WO | WO-99/39466 | 8/1999 |
| WO | WO-99/44698 A2 | 9/1999 |
| WO | WO-99/56473 | 11/1999 |
| WO | WO-99/60790 | 11/1999 |
| WO | WO-99/64969 | 12/1999 |
| WO | WO-99/65244 | 12/1999 |
| WO | WO-99/66725 | 12/1999 |
| WO | WO-00/04706 | 1/2000 |
| WO | WO-00/05885 | 2/2000 |
| WO | WO-00/11869 | 3/2000 |
| WO | WO-00/16548 | 3/2000 |
| WO | WO-00/17738 | 3/2000 |
| WO | WO-00/30345 | 5/2000 |
| WO | WO-00/33208 | 6/2000 |
| WO | WO-00/33560 | 6/2000 |
| WO | WO-00/33565 | 6/2000 |
| WO | WO-00/33576 A1 | 6/2000 |
| WO | WO-00/58967 | 10/2000 |
| WO | WO-00/59230 | 10/2000 |
| WO | WO-01/01677 | 1/2001 |
| WO | WO-01/01689 | 1/2001 |
| WO | WO-01/35662 | 5/2001 |
| WO | WO-01/50743 | 7/2001 |
| WO | WO-01/91458 A2 | 11/2001 |
| WO | WO-01/91460 A2 | 11/2001 |
| WO | WO-03/046727 | 6/2003 |
| WO | WO-2004/023810 A1 | 3/2004 |
| WO | WO-2004/032511 | 4/2004 |
| WO | WO-2004/061699 | 7/2004 |
| WO | WO-2007/036891 A2 | 4/2007 |
| WO | WO-2007/078503 | 7/2007 |
| WO | WO-2008/042267 A2 | 4/2008 |
| WO | WO-2008/047184 A1 | 4/2008 |
| WO | WO-2009/067670 A1 | 5/2009 |
| WO | WO-2009/067676 A1 | 5/2009 |
| WO | WO-2009/079560 A1 | 6/2009 |
| WO | WO-2009/130862 A1 | 10/2009 |
| WO | WO-2009/148056 A1 | 12/2009 |
| WO | WO-2009/148833 A1 | 12/2009 |
| WO | WO-2009/151635 A1 | 12/2009 |
| WO | WO-2011/008638 A1 | 1/2011 |
| WO | WO-2011/037761 A1 | 3/2011 |
| WO | WO-2011/037781 A2 | 3/2011 |
| WO | WO-2011/084950 A2 | 7/2011 |

OTHER PUBLICATIONS

U.S. Appl. No. 11/324,202, filed Dec. 29, 2005, Yates, Douglas.
"Addressable Converters: A New Development at CableData," Via Cable, vol. 1, No. 12 (Dec. 1981).
"Audio Advertisement Recognition," SIGNALogic [online]. Retrieved from the Internet on Sep. 8, 2010: URL: <http://www.signalogic.com/index.pl?p.=ad_recog>. Two pages.
"Digital Video Broadcasting (DVB); DVB specification for data broadcasting", European Telecommunications Standards Institute, Draft EN 301 192 V1.2.1 (Jan. 1999).
"Electronic Programme Guide (EPG); Protocol for a TV Guide using electronic data transmission" by European Telecommunication Standards Institute, May 1997, Valbonne, France, publication No. ETS 300 707.
"Honey, is there anything good on the remote tonight?", advertisement from Multichannel News, Broadband Week Section, Nov. 30, 1998, p. 168.
"How Evolve Works," from the Internet at http://www.evolveproducts.com/network.html, printed on Dec. 28, 1998.
"Jini Architecture Overview," by Jim Waldo, from the Internet at http://Java.sun.com/products/jini/whitepapers/architectureoverview.pdf/ pinted on Jan. 25, 1999. The document bears a copyright date of 1998.
"Reaching your subscribers is a complex and costly process-until now," from the Internet at http://www.evolveproducts.com/info.html, printed on Dec. 28, 1998.
"Simulation and Training", 1994, 6 pages, HP Division Incorporated.

(56) References Cited

OTHER PUBLICATIONS

"Sun's Next Steps in Digital Set-Tops," article in Cablevision, Nov. 16, 1998, p. 56.
"The Evolve EZ Guide. The Remote Control," from the Internet at http://www.evolveproducts.com/display2.html, printed on Dec. 28, 1998.
"*Using StarSight 2*," published before Apr. 19, 1995.
"Virtual High Anxiety", Tech Update, Aug. 1995, pp. 22.
"*What is Jini?*", from the Internet at http://java.sun.com/products/jini/whitepapers/whatsjini.pdf, printed on Jan. 25, 1999.
"*Why Jini Now?*", from the internet at http://java.sun.com/products/jini/whitepapers/whyjininow.pdf, printed on Jan. 25, 1999. The document bears a copyright date of 1998.
A. C. Snoeren et al., "An End-to-End Approach to Host Mobility" 6th ACM-IEEE International Conference on Mobile Computing and Networking (MOBICOM 2000), Boston, MA, USA, Aug. 2000, pp. 1-12.
Aggarwal et al.. "Human Motion Analysis: A Review", IEEE Nonrigid and Articulated Motion Workshop, 1997, pp. 90-102, University of Texas at Austin, Austin, TX.
Arango et al., "The Touring Machine System," Communications of the ACM, Jan. 1993, vol. 36, No. 1, pp. 68-77.
Article: "Windows 98 Feature Combines TV, Terminal and the Internet", New York Times, Aug. 18, 1998.
Azarbayejani et al., "Visually Controlled Graphics", Jun. 1993, pp. 602-605, vol. 15, No. 6, IEEE Transactions on Pattern Analysis and Machine Intelligence.
Breen et al., "Interactive Occlusion and Collision of Real and Virtual Objects in Augmented Reality", Technical Report ECRC-95-02, 1995, European Computer-Industry Research Center GmbH, Munich, Germany.
Brogan et al., "Dynamically Simulated Characters in Virtual Environments", Sep./Oct. 1998, pp. 58-69, vol. 18, Issue 5, IEEE Computer Graphics and Applications.
BrugLiera, V. "Digital On-Screen Display—A New Technology for the Consumer Interface," Symposium Record Cable Sessions, 18th International Television Symposium and Technical Exhibition, Montreux, Switzerland Jun. 10-15, 1993, pp. 571-586 (Jun. 11, 1993).
CableData brochure, "A New Approach to Addressability" (undated).
Chang, Y., et al., "An Open-Systems Approach to Video on Demand," IEEE Communications Magazine, vol. 32, No. 5 pp. 68-80 (May 1994).
Darrow, A. et al., "Design Guidelines for Technology-Mediated Social Interaction in a Presence Sensing Physical Space," Carnegie Mellon University Research Showcase, Carnegie Institute of Technology, Jan. 1, 2007, pp. 1-9.
David M. Rudnick, U.S. Appl. No. 09/283,681, filed Apr. 1, 1999, entitled Interactive Television Program Guide System Having Graphic Arrangements of Program Event Regions.
Dimitrova, et al. "Personalizing Video Recorders in Multimedia Processing and Integration." ACM 2001.
Eitz, Gerhard, "Zukunftige Informations-Und Datenangebote Beim Digitalen Fernsehen—EPG Und Lesezeichen," Rundfunktechnische Mitteilungen, vol. 41, pp. 67-72, Apr. 30, 1997. (English language translation attached.).
F. Teraoka et al., "Host Migration Transparency in IP networks: The VIP Approach" ACM SIGCOMM—Computer Communication Review, ACM Press, New York, NY, USA, Jan. 1993, pp. 45-65.
Fisher et al., "Virtual Environment Display System", ACM Workshop on Interactive 3D Graphics, Oct. 1986, 12 pages, Chapel Hill, NC.
Fortino et al., A Cooperative Playback System for On-Demand Multimedia Sessions over Internet, 2000 IEEE, pp. 41-44.
Freeman et al., "Television Control by Hand Gestures", Dec. 1994, Mitsubishi Electric Research Laboratories, TR94-24, Caimbridge, MA.
Gondow, S., et al., "The Architecture of Communication Migration and Media State Management for Distributed Applications on Wearable Networks," Information Processing Society of Japan (National Conference Lecture Collected Paper), Tokyo, Japan, Oct. 3, 2000, pp. 1-2.
Granieri et al., "Simulating Humans in VR", The British Computer Society, Oct. 1994, pp. 1-4,6-9, 12, 15-16, and 18-21 (15 pages) Academic Press.
Haas et al., Proceedings of ICIP 2002 Personalized News Through Content Augmentation and Profiling:, Rochester, NY, Sep. 2002.
Han et al., "Dynamic Adaptation in an Image Transcoding Proxy for Mobile Web Browsing," IEEE Personal Communications, Dec. 1998, pp. 8-17.
Hasegawa et al., "Human-Scale Haptic Interaction with a Reactive Virtual Human in a Real-Time Physics Simulator", Jul. 2006, 12 pages, vol. 4, No. 3, Article 6C, ACM Computers in Entertainment, New York, NY.
He, "Generation of Human Body Models", Apr. 2005, 111 pages, University of Auckland, New Zealand.
Hofmann, et al., "Videotext Programmiert Videorecorder," Rundfunktechnische Mitteilungen, Nov.-Dec. 1982, pp. 254-257 (translation abstract attached).
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Hsieh. C.. "Personalized Advertising Strategy for Integrated Social Networking Websites", IEEE/WIC/ACM International Conference on Web Intelligence and Intelligent Agent Technology, Dec. 2008, pp. 369-372, IEEE Computer Society Washington, DC, USA.
IBM Corporation "IBM Content Manager VideoCharger, New dimensions for enterprise content, DB2 Data Management Software" pp. 1-4, Mar. 2002.
IBM Corporation "IBM Content Manager VideoCharger, Version 8, New dimensions for enterprise content, DB2 Data Management Software, pp. 1-4," May 2002, Visit IBM Web site at ibm.com/software/data/videocharger.
IBM Corporation "IBM VideoCharger for AIX Version 2.0 Streaming the power of video to your desktop, pp. 1-5 " Visit the IBM VideoCharger Website at: www.software.ibm.com/data/videocharger/.
IBM Corporation, "IBM Video Charger Server", pp. 102, Jun. 1998.
Index Systems Inc., "Gemstar Service Object Model," Data Format Specification, Ver. 2.0.4, pp. 58-59, Dec. 20, 2002.
International Preliminary Report on Patentability dated Mar. 26, 2013 in International Patent Application No. PCT/ US/2011/048706. 5 pages.
International Search Report dated Apr. 10, 2012 in International Patent Application No. PCT/US/2011/048706. 3 pages.
Isard et al., "CONDENSATION—Conditional Density Propagation for Visual Tracking", 1998, pp. 5-28, International Journal of Computer Vision 29(1), Netherlands.
Jaidev, "EXSLT—Wired and Wireless Case Study," http://csharpcomputing.com/XMLTutorial/Lession15.htm.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.
Kim, G., "IAB Social Advertising Best Practices", The IAB User-Generated Content & Social Media Committee, May 2009, [online], [retrived on Jun. 22, 2010] Retrieved from the Social Media of IAB using Internet ,<URL: http://www.iab. net/media/file/Sociai-Advertising-Best-Practices-0509.pdf>, 19 pages.
Kohler, "Special Topics of Gesture Recognition Applied in Intelligent Home Environments", In Proceedings of the Gesture Workshop, 1998, pp. 285-296, Germany.
Kohler, "Technical Details and Ergonomical Aspects of Gesture Recognition applied in Intelligent Home Environments", 1997, 35 pages, Germany.
Kohler, "Vision Based Remote Control in Intelligent Home Environments", University of Erlangen-Nuremberg/ Germany, 1996, pp. 147-154, Germany.
Li, et al., "Distributed Multimedia Systems," Proceedings of the IEEE, vol. 85, No. 7, pp. 1063-1108 (Jul. 1997).

(56) References Cited

OTHER PUBLICATIONS

Livingston, "Vision-based Tracking with Dynamic Structured Light for Video See-through Augmented Reality", 1998, 145 pages, University of North Carolina at Chapel Hill, North Carolina, USA.
Mah et al., "Providing Network Video Service to Mobile Clients," 1993 IEEE, pp. 48-54.
Miller, M. D. "A Scenario for the Deployment of Interactive Multimedia Cable Television Systems in the United States in the 1990's," Proceedings of the IEEE, vol. 82, No. 4, pp. 585-589 (Apr. 1994).
Miyagawa et al., "CCD-Based Range Finding Sensor", Octobe51855986_1r 1997, pp. 1648-1652, vol. 44 No. 10, IEEE Transactions on Electron Devices.
Neumann, Andreas, "WDR Online Aufbau Und Perspektiven Automatisierter Online-Dienste Im WDR," Rundfunktechnische Mitteilungen, vol. 41, Jan. 21, 1997, pp. 56-66. (English language translation attached.).
Owyang, J., "Contextual Ads Based Off Social Network Profile: Twitter and Facebook", Web Strategy [online], Jun. 18, 2009 [retrieved on Jun. 22, 2010], Retrieved from the Internet: <URL: http://www.web-strategist.com/blog/2009/06/18/contextual-ads-based-off-social-network-profile-twitter-and-facebookl>, 10 pages.
Papers Delivered (Part1), 61st National Conference, Information Processing Society of Japan, Oct. 3-5, 2000.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Pham et al,, "Exploiting Location-Based Composite Devices to Support and Facilitate Situated Ubiquitous Computing," HUC 2000, LNCS 1927, pp. 143-156.
Pogue, D., "State of the Art: For TiVo and Replay, New Reach," N.Y. Times, May 29, 2003.
Qian et al., "A Gesture-Driven MultimodalInteractive Dance System", Jun. 2004, pp. 1579-1582, IEEE International Conference on Multimedia and Expo (ICME), Taipei, Taiwan.
Randerson, J., "Let Software Catch the Game for You," New Scientist, Jul. 3, 2004.
Realplayer 8 Plus User Manual, Rev. 1, Real Networks, Inc. p. 32 (2000).
Rogers, Curt, "Telcos vs. Cable TV: The Global View," Data Communications, No. 13, New York, Sep. 1995, pp. 75, 76, 78 and 80.
Rosenhahn et al., "Automatic Human Model Generation", 2005, pp. 41-48, University of Auckland (CITR), New Zealand.
Seles, Sheila Murphy, "Audience Research for Fun and Profit: Rediscovering the Value of Television Audiences", Submitted to the program in Comparative Media Studies, Jun. 2010, 128 pages, Massachusetts Institute of Technology.
Shao et al., "An Open System Architecture for a Multimedia and Multimodal User Interface", Aug. 24, 1998, 8 pages, Japanese Society for Rehabilitation of Persons with Disabilities (JSRPD), Japan.
Sheridan et al., "Virtual Reality Check", Technology Review, Oct. 1993, pp. 21-28, vol. 96, No. 7.
Sorce, J. et al., "Designing a Broadband Residential Entertainment Service: A Case Study," 13th International Symposium Human Factors in Telecommunications, Torino, Italy, Sep. 10-14, 1990 pp. 141-148.
Stevens, "Flights into Virtual Reality Treating Real-World Disorders", The Washington Post, Mar. 27, 1995, Science Psychology, 2 pages.
The New York Times Website Article, "2 Makers Plan Introductions of Digital VCR", by John Markoff, Mar. 29, 1999.
Toyama, et al, "Probabillistic Tracking in a Metric Space," Eighth international Conference on Computer Vision, Vancouver, Canada, vol. 2, Jul. 2001, 8 page.
Wren et al.. "Pfinder: Real-Time Tracking of the Human Body", MIT Media Laboratory Perceptual Computing Section Technical Report No. 353. Jul. 1997, vol. 19, No. 7, pp. 780-785, IEEE Transactions on Pattern Analysis and Machine Intelligence, Caimbridge, MA.
Zhao, "Dressed Human Modeling, Detection, and Parts Localization", 2001, 121 pages, The Robotics Institute, Carnegie Mellon University, Pittsburgh, PA.

* cited by examiner

SYSTEMS AND METHODS FOR RECOMMENDING CONTENT

BACKGROUND

In conventional systems, a user has to login or otherwise select an account identity on their user equipment device in order to receive personalized content. For example, the user may login to their set-top box in order to receive recommended content for viewing including one or more of television broadcasts, streaming internet media, and on-demand programs.

The recommended content may be selected based on the user's profile associated with his or her login or account identity. For example, the user's profile may include viewing history and related viewing preferences for the user. However, if the user is not logged in, he or she may not receive the appropriate content recommendations. Additionally, if the user is not logged in, the user's viewing history or related viewing preferences may not be recorded in his or her user profile for future content recommendations.

Accordingly, there is a need for systems and methods that will alleviate the issues described above and aid in making better content recommendations for the user.

SUMMARY OF THE DISCLOSURE

Systems and methods for recommending content to a user are described. A user equipment device may be equipped with a built-in or separately connected image capturing device which may be used to pinpoint the location of the remote control when it is activated, thereby defining the specific location of the remote and the user. The relative location of the user in the room where the television is located may be associated with that particular user and used to automatically log in and access their user profile. This information may be used to enhance the television experience for the user by, e.g., recommending content.

In some implementations, when a button on the user's remote control device is pressed, the infrared (IR) device placed in the remote control device activates to send a signal to a sensor connected to the user equipment device. Upon receipt of the signal, the user equipment device may activate a built-in or separately connected camera to detect the location of the remote within the user's viewing area. As used herein, a "viewing area" refers to a finite distance from a display device typically associated with an area in which a user may be capable of viewing media assets and/or advertisements on the display device. In some embodiments, the size of the viewing area may vary depending on the particular display device. For example, a display device with a large screen size may have a greater viewing area than a display device with a small screen size. In some embodiments, the viewing area may correspond to the range of the image capturing device associated with the media application. For example, if the image capturing device can detect a user only within five feet of a display device, the viewing area associated with the display device may be only five feet. Various systems and methods for detecting users within a range of a media device, is discussed in, for example, Shimy et al., U.S. patent application Ser. No. 12/565,486, filed Sep. 23, 2009, which is hereby incorporated by reference herein in its entirety.

The user equipment may detect the location of the remote by identifying the location of the pixels within the camera sensor's field of view that are activated by the IR signal. The user equipment device may also approximate the distance of the remote from the user equipment device through the number of pixels that are triggered. The identification may be further, or alternatively, enhanced by placing two IR devices in the remote control device such that they are mounted at a known distance apart. The user equipment device may determine the location and distance accurately and additionally determine the orientation (angle) of the remote control device based on the location of the pixels activated by each IR signal and the known distance between the two IR devices.

Typically, the viewing areas where the user's television and/or set-top box are located have a consistent and unchanging arrangement of furniture. The number of possible seating positions within the viewing area is generally small, e.g., 4 to 6 and typically less than or equal to 10. In such situations, most users tend to sit in the same position or a few limited positions and operate their remote control device from their usual position. Therefore, the number of positions in which the remote control device may be detected when a button is pressed may correspond to the number of users in the viewing area. For example, if a user is always seated on his or her preferred couch seat, the location of the remote control device in the viewing area may be associated with the particular user. By defining the detected locations of the remote control device over multiple activations, the user equipment device may determine the number of users and his or her positions in the viewing area.

In some implementations, the user equipment device may automatically detect and define user areas in the viewing area based on the positions where the remote control device is activated. Each user area may be associated with a user profile including viewing history and viewing preferences, such as volume, color, brightness, video quality, etc. The user equipment device may "learn" the correlation between a user area and the content selected from that user area by keeping track of the viewing history and related viewing preferences, e.g., by monitoring and storing the content selections the user makes and/or other interactions the user may have with the guidance application. The user equipment device may enhance the viewing experience for the user by retrieving their user profile and making personalized content recommendations to the user associated with the particular user area.

For example, a user "John" may always sit in a particular user area and mostly view action movies. When the remote control device is detected in that position, the user equipment device may make personalized content recommendations including action movies. In another example, a child "Mike" may mostly view content from another position and the user equipment device may recommend children's content when the remote control device is detected in that position. In some implementations, users may adapt to the user profile generation process and consciously use a fixed seating position in the viewing area to further refine their user profile and receive better content recommendations.

In some implementations, the user area defined for a particular user may be further refined based on time-based restrictions. For example, a given user area may be associated with user "John" during weekends but with his wife "Marie" during weekdays. The user equipment device may make better content recommendations to the user activating the remote control device by taking the day into account. When the remote is detected in the given user area on a weekday, the user equipment device may retrieve Marie's profile and make personalized content recommendations including soap operas of interest to Marie. However, when the remote is detected in the given user area on a weekend, the user equipment device may instead retrieve John's profile and make personalized content recommendations including football games of interest to John.

In some implementations, the systems and methods described herein include a method for recommending content. The method includes receiving input at a user equipment device from a remote control device operated by a user positioned in a viewing area. In response to receiving the input, an instruction is transmitted to activate an image capturing device. The method further includes receiving from the image capturing device an image of the viewing area. The method further includes analyzing the received image to detect a position of the remote control device. The method further includes retrieving from a storage device a profile for the user based on the determined position. The method further includes determining media content of interest to the user based on the retrieved profile. The method further includes generating a display recommending the media content to the user.

In some embodiments, the retrieved profile is includes a viewing history of media content selected when the remote control device is positioned in a vicinity of the determined position in the viewing area. For example, the remote control device may be positioned within 0.1 cm, 1 cm, 10 cm, or any other suitable distance in the vicinity of the determined position in the viewing area. In some embodiments, the viewing history includes the media content selected in a vicinity of a particular time and/or the media content selected on a particular day. For example, viewing history includes the media content selected within one second, one minute, one hour, or any other suitable time period in the vicinity of the particular time.

In some embodiments, analyzing the received image to detect a position of the remote control device includes receiving a signal from the remote control device that is captured in the image. The method further includes identifying location of one or more pixels that are activated in the image due to the signal from the remote control device, e.g., identifying location of pixels that have particular values corresponding to an infrared (IR) signal. The method further includes determining the position of the remote control device based on the identified location.

In some embodiments, the method further includes receiving two signals simultaneously from the remote control device at the image capturing device. The method further includes identifying a first location of pixels and a second location of pixels that are activated in the image due to the two signals from the remote control device. The method further includes retrieving a distance associated with the two signals and calculating a distance of the remote control device from the image capturing device and its location relative to the image capturing device in the viewing area based on the identified first and second locations and the retrieved distance. In some embodiments, the image capturing device is built in to the display device or separately connected but adjacent to the display device. In such embodiments, the calculated distance may be used to approximate the distance of the remote control device from the display device. The method further includes determining the position of the remote control device based on the identified first and second locations and the calculated distance. In some embodiments, the two signals are received simultaneously from two infrared (IR) devices included in the remote control device.

In some embodiments, the method further includes determining a location of a second user in the viewing area. The method further includes retrieving from the storage device a profile for the second user based on the location. The method further includes determining media content of interest to both users based on their profiles. In some embodiments, determining the location of the second user in the viewing area further includes analyzing the received image to detect silhouettes corresponding to one or more users. The method further includes retrieving from the storage device a silhouette for the second user. The method further includes comparing the retrieved silhouette for the second user to the silhouettes detected in the image. The method further includes determining the location of the second user in the viewing area based on the comparison.

In some embodiments, the method further includes receiving a plurality of inputs from the remote control device over a period of time. The method further includes receiving from the image capturing device a plurality of images of the viewing area over the period of time. The method further includes clustering a plurality of positions in the viewing area to define a user area based on the position of the remote control device in each captured image.

In some embodiments, the method further includes receiving a plurality of inputs from the remote control device over a period of time. The method further includes receiving from the image capturing device a plurality of images of the viewing area over the period of time. The method further includes determining a plurality of locations in the viewing area based on the position of the remote control device in each captured image. The method further includes determining a number of users and/or user areas in the viewing area over the period of time based on the plurality of locations.

In some embodiments, the method further includes receiving the image of the viewing area from the image capturing device. The method further includes analyzing the received image to detect the position of the remote control device and determining the user area associated with the detected position. The method further includes retrieving the profile for the user from the storage device based on the determined user area.

In some aspects, the systems and methods described herein include a system or apparatus for recommending content configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for recommending content to a user. In some implementations, the systems and methods utilize a built-in or separately connected image capturing device to locate the position of the remote control device when it is activated in the viewing area, thereby defining the specific position of the remote and the user. As used herein, a "viewing area" refers to a finite distance from a display device typically associated with an area in which a user may be capable of viewing media assets and/or advertisements on the display device. In some embodiments, the size of the viewing area may vary depending on the particular display device. For example, a display device with a large screen size may have a greater viewing area than a display device with a small screen size. In some embodiments, the viewing area may correspond to the range of the detection modules associated with the media application. For example, if the detection module can detect a user only within five feet of a display device, the viewing area associated with the display device may be only five feet. Various systems and methods for detecting users within a range of a media device, is discussed in, for example, Shimy et al., U.S. patent application Ser. No. 12/565,486, filed Sep. 23, 2009, which is hereby incorporated by reference herein in its entirety.

The relative position of the user in the viewing area where the user equipment device is located may be associated with that particular user and used to automatically login and access their user profile. This information may be used to enhance the television experience for the user by, e.g., recommending content.

In some implementations, a user equipment device including control circuitry recommends content to a user. The control circuitry receives input at the user equipment device from a remote control device operated by a user positioned in a viewing area. For example, the input may be an infrared (IR) signal received from an IR device placed in the remote control device. In response to receiving the input, control circuitry transmits an instruction to activate an image capturing device, e.g., a built-in or separately connected camera. The control circuitry receives from the image capturing device an image of the viewing area and analyzes the image to detect a position of the remote control device. For example, the control circuitry may compare the image to one or more previously or subsequently captured images to determine the pixels activated in the image due to the IR signal. For instance, in response to detecting the signal with a sensor, the camera may rapidly take a series of pictures and then analyze them to determine the portion that is changing across the images.

Figure 5:
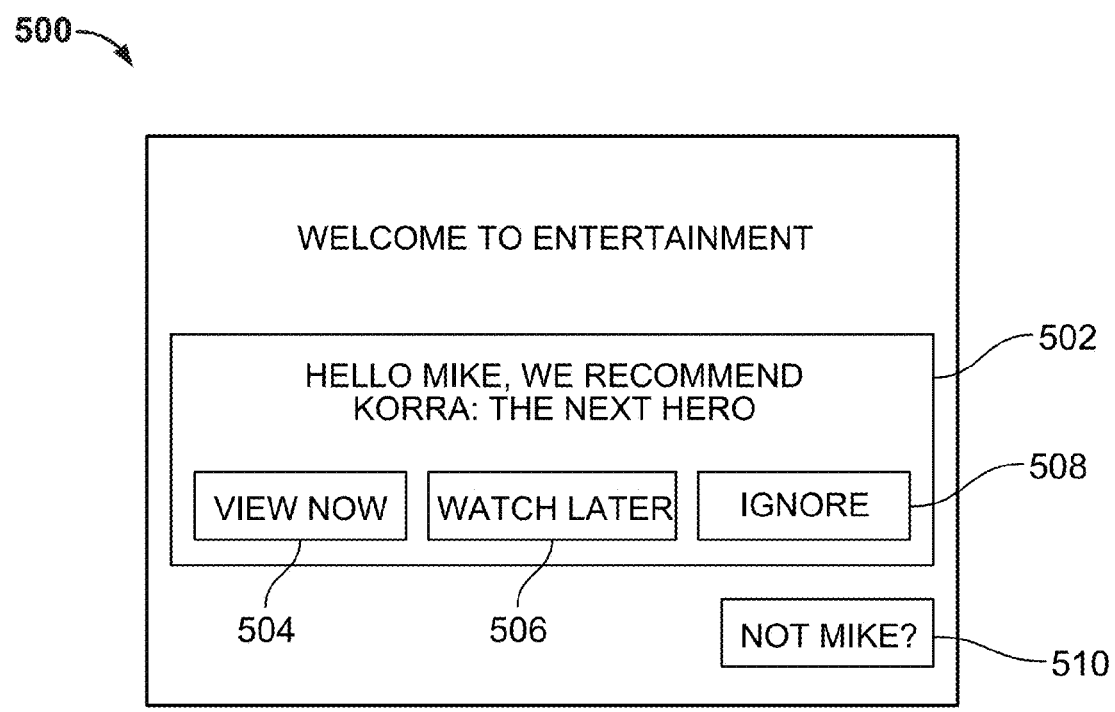
FIG. 5 is an illustrative display screen for providing recommended media content in accordance with some embodiments of the disclosure.

The control circuitry retrieves from a storage device a profile for the user based on the determined position and determines media content of interest to the user based on the retrieved profile. For example, the control circuitry may determine that the user "Mike" may find the television program "Korra: The Next Hero" of interest (as shown in FIG. 5 below). The control circuitry may make the determination by analyzing the viewing history in the user's profile and searching for programs similar to those previously viewed by the user. The control circuitry generates a display recommending the media content of interest to the user. Media recommendation displays and their functionalities are described in greater detail in Ellis et al. U.S. Pat. No. 6,898,762, issued May 24, 2005 and Corday et al. U.S. Patent Application Publication No. 2007/0157222, published Jul. 5, 2007, which are hereby incorporated by reference herein in their entireties.

In some embodiments, the retrieved profile is based on a viewing history of media content selected when the remote control device is positioned in a vicinity of the determined position in the viewing area. For example, the remote control device may be positioned within 0.1 cm, 1 cm, 10 cm, or any other suitable distance in the vicinity of the determined position in the viewing area. In another example, the determined position may be associated with a user profile including viewing history and/or viewing preferences, such as volume, color, brightness, video quality, etc. The user equipment device may "learn" the correlation between the user area and the content viewed and may generate a profile for the user area.

In some embodiments, the viewing history includes the media content selected in a vicinity of a particular time and/or the media content selected on a particular day. For example, viewing history includes the media content selected within one second, one minute, one hour, or any other suitable time period in the vicinity of the particular time. In another example, a given user area may be associated with user "John" during weekends but with his wife "Marie" during weekdays. The user equipment device may make better content recommendations to the user activating the remote control device by taking the day into account. When the remote is detected in the given user area on a weekday, the user equipment device may retrieve Marie's profile and make personalized content recommendations including soap operas. However, when the remote is detected in the given user area on a weekend, the user equipment device may instead retrieve John's profile and make personalized content recommendations including football games.

In some embodiments, control circuitry analyzes the received image to detect a position of the remote control device by locating a signal from the remote control device that is captured in the image. For example, the received image may include a captured infrared (IR) signal received from the remote control device. The control circuitry identifies the location of one or more pixels that are activated in the image due to the IR signal from the remote control device. The control circuitry determines the position of the remote control device based on the identified location. For example, the control circuitry may compare the image to a previously captured image to determine the pixels activated in the image due to the IR signal.

In some embodiments, the control circuitry receives an indication of two signals simultaneously from the remote control device. For example, the remote control device may include two IR devices that send signals simultaneously to an IR sensor connected to the control circuitry. The control circuitry instructs the image capture device to capture an image and on receipt analyzes the image to identify a first location of pixels and a second location of pixels that are activated in the image due to the two signals from the remote control device.

The control circuitry retrieves a distance between the two IR devices placed in the remote control device. The distance is a fixed measure of the spacing between the two IR devices and may be used to calculate the distance of the remote control device from the image capturing device and its location relative to the image capturing device in the viewing area. The control circuitry calculates the distance of the remote control device from the image capturing device in the viewing area based on the first and second locations of the two IR signals in the captured image as well as the retrieved distance associated with the two IR signals. In some embodiments, the image capturing device is built in to the display device or separately connected but adjacent to the display device. In such embodiments, the calculated distance may be used to approximate the distance of the remote control device from the display device. The control circuitry determines the position of the remote control device in the viewing area based on the first and second positions corresponding to the pixels activated in the captured image due to the two IR signals and the calculated distance. The position in this case may be a 3-dimensional value indicating the position of the user in the viewing area.

In some embodiments, the control circuitry further determines a location of a second user in the viewing area. The control circuitry retrieves from the storage device a profile for the second user based on the location. The control circuitry makes media content recommendations such that they are of interest to both users based on their profiles. For example, the control circuitry may determine the location of the second user in the viewing area by analyzing the image from the image capture device to detect silhouettes corresponding to the users in the viewing area. The silhouettes may be detected using edge detection, corner detection, blob detection, or other such suitable image processing techniques. Such techniques are fundamental tools in image processing, machine vision and computer vision, particularly in the areas of feature detection and feature extraction. The control circuitry may identify points in an image at which the image brightness changes sharply or has discontinuities to determine silhouettes for the users in the viewing area. The control circuitry retrieves from the storage device a silhouette for the second user and compares the retrieved silhouette for the second user to the silhouettes detected in the image. If there is a match, the control circuitry associates the location in the viewing area with the profile of the second user.

In some embodiments, the control circuitry receives a plurality of inputs from the remote control device over a period of time and receives from the image capturing device a plurality of images of the viewing area over the same period of time. The control circuitry clusters the plurality of positions in the viewing area to define a user area based on the position of the remote control device in each captured image. The control circuitry associates the defined user area with the user. Any future remote control signals from the defined user area may be used to construct or retrieve the user's profile including a viewing history and/or viewing preferences, e.g., volume, brightness, video quality, etc.

In some embodiments, the control circuitry receives a plurality of inputs from the remote control device over a period of time and receives from the image capturing device a plurality of images of the viewing area over the same period of time. The control circuitry determines a plurality of locations in the viewing area based on the position of the remote control device in each captured image. The control circuitry determines a number of users in the viewing area over the period of time based on the plurality of locations. Any future remote control signals from the defined user areas may be used to construct or retrieve corresponding user profiles including a viewing history and/or viewing preferences, e.g., volume, brightness, video quality, etc.

In some embodiments, the control circuitry receives the image of the viewing area from the image capturing device. The control circuitry analyzes the received image to detect the position of the remote control device and determines the user area associated with the detected position. Finally, the control circuitry retrieves the profile for the user from the storage device based on the determined user area.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Media applications may take various forms depending on their function. Some media applications generate graphical user interface screens (e.g., that enable a user to navigate among, locate and select content), and some media applications may operate without generating graphical user interface screens (e.g., while still issuing instructions related to the transmission of media assets and advertisements).

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "display device," "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera. These cameras, for example, can be used to capture an image of an IR signal from a remote control device, as discussed further herein. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media applications may be provided as on-line applications (i.e., provided on a website), or as stand-alone applications or clients on user equipment devices. Various devices and platforms that may implement media applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 1:
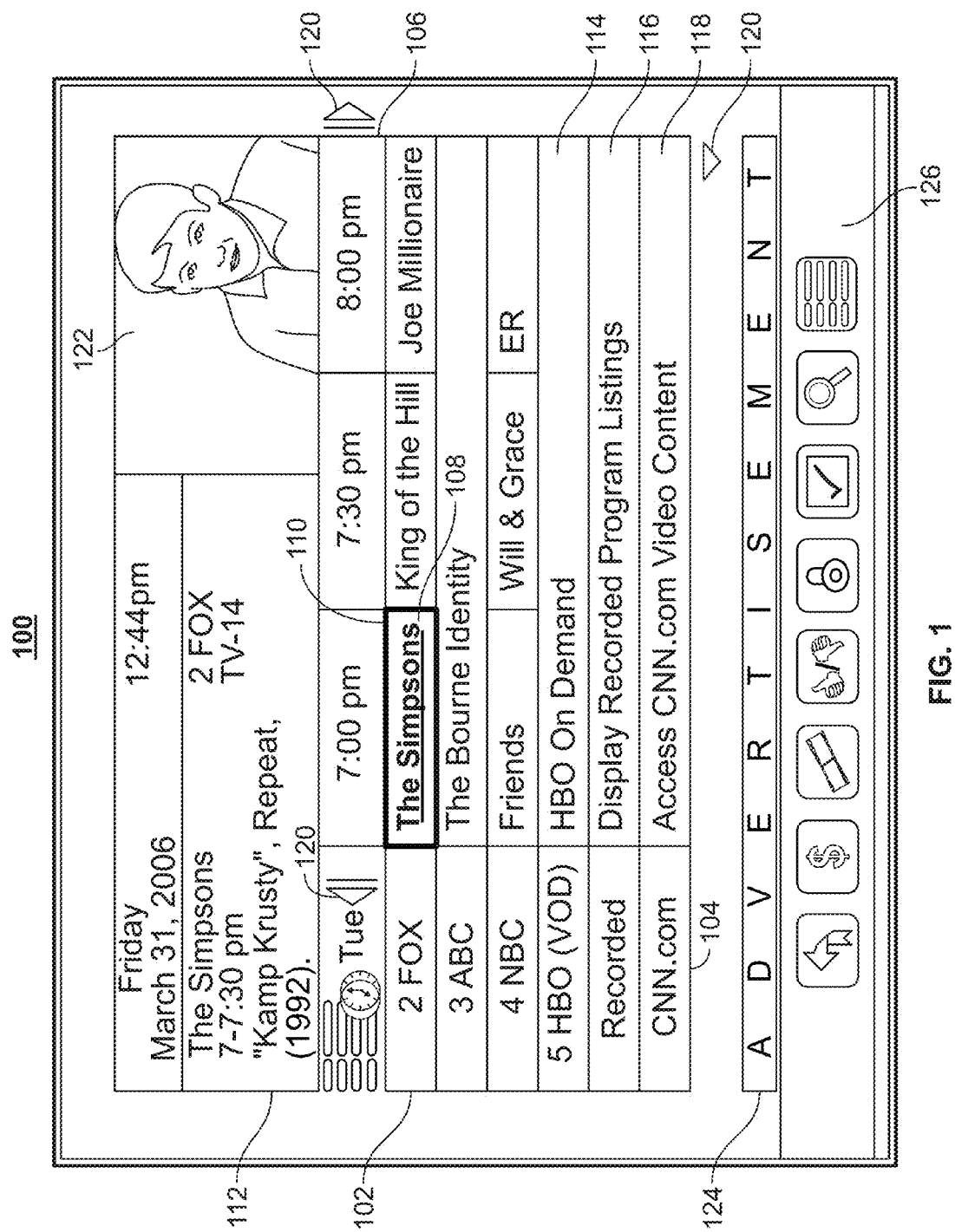
FIGS. 1 and 2 show illustrative display screens that may be used to provide media guidance application listings in accordance with some embodiments of the disclosure.
Figure 2:
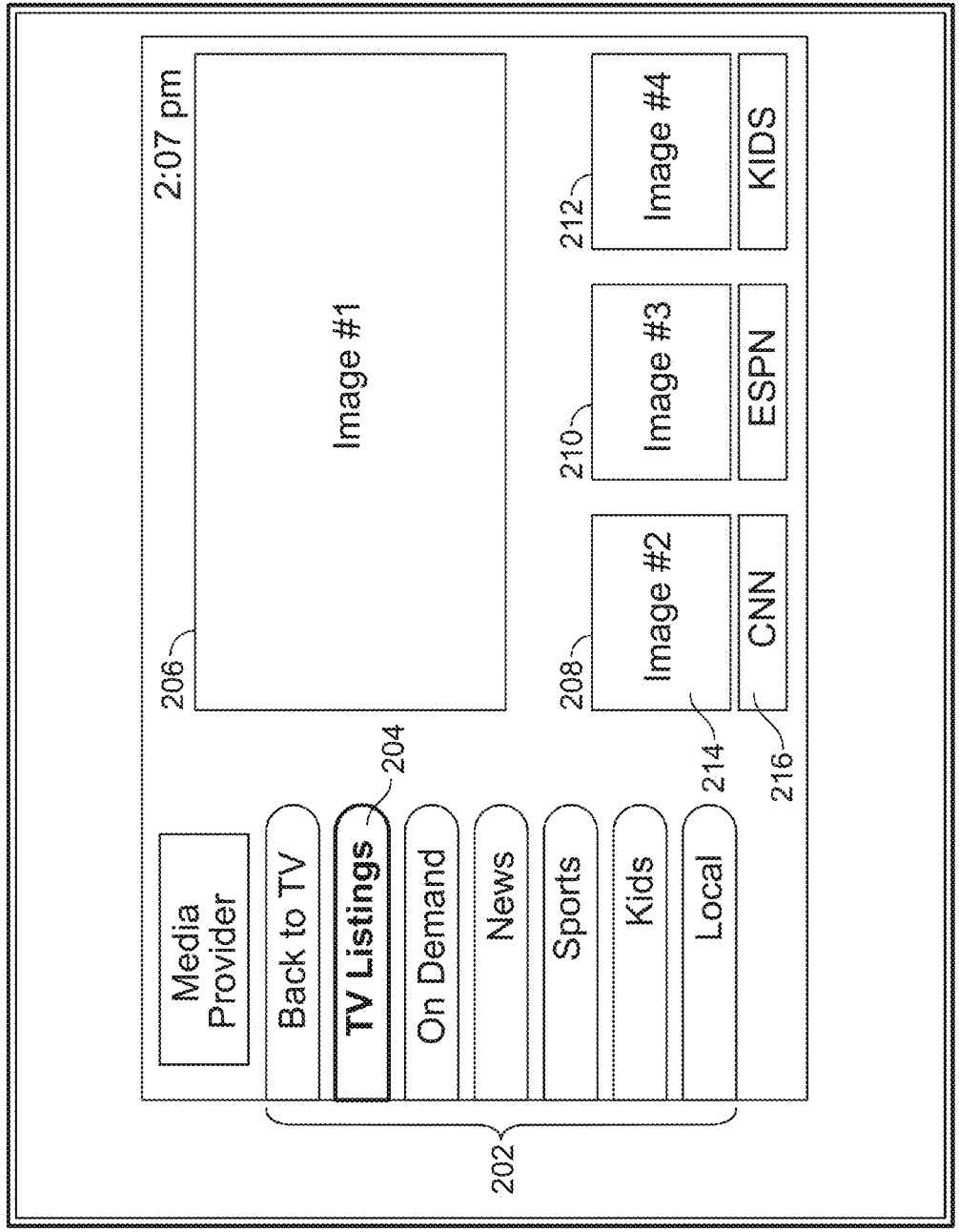

FIGS. 1-2 show illustrative display screens that may be used to provide media guidance data. The display screens shown in FIGS. 1-2 and 5A-9 may be implemented on any suitable user equipment device or platform. While the displays of FIGS. 1-2 and 5-6C are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to, one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, options to view related content that provides background information or context for a selected media content, options to view the related content on a second screen device, options to view additional related content, options to add related content to a queue for later viewing, options to resume playback of the selected media content, options to specify an ordering scheme and/or criteria for the ordering scheme, or other suitable options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. In some embodiments, the user profile information may be associated with input received from a remote control device over a period of time. Control circuitry may determine the position of the remote control device in the user's viewing area and cluster the positions to define a user area. The control circuitry may associate the defined user area with the user and store the interactions including viewing history and/or viewing preferences in the user profile information. Any future remote control signals from the defined user area may be used to construct or retrieve the user's profile information.

Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
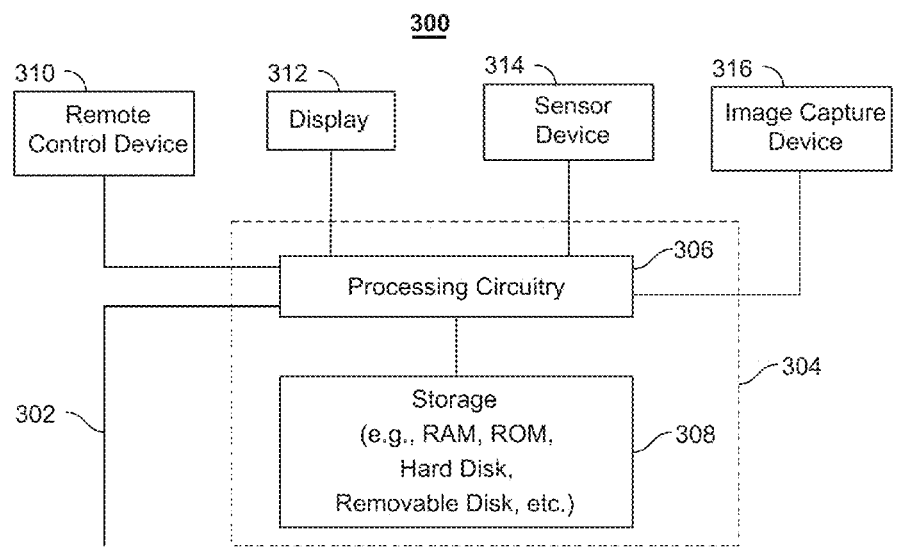
FIG. 3 is a block diagram of an illustrative user equipment device in accordance with some embodiments of the disclosure.

FIG. 3 is a block diagram of an illustrative user equipment device in accordance with some embodiments of the disclosure. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiples of the same type of processing units (e.g., two Intel Core i7 processors) or multiple different processors (e.g., an Intel Core i5 processor and an Intel Core i7 processor). In some embodiments, control circuitry 304 executes instructions for a media application stored in memory (i.e., storage 308). Specifically, control circuitry 304 may be instructed by the media application to perform the functions discussed above and below. For example, the media application may provide instructions to control circuitry 304 to generate the media guidance displays. In some implementations, any action performed by control circuitry 304 may be based on instructions received from the media application.

In client-server based embodiments, control circuitry 304 may include communications circuitry suitable for communicating with a media-application server or other networks or servers. The instructions for carrying out the above mentioned functionality may be stored on the media application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and media application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive advertisement data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using a user input interface, e.g., remote control device 310. Remote control device 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Sensor device 314 may be provided as integrated with other elements of user equipment device 300 or may be stand-alone units. Sensor device 314 may receive signals from remote control device 310 and indicate receipt of such signals to control circuitry 304. In some embodiments, sensor device 314 is an infrared (IR) receiver that receives IR signals from remote control device 310. In some embodiments, sensor 314 includes multiple IR receivers that receive IR signals from remote control device 310. Image capture device 316 may be provided as integrated with other elements of user equipment device 300 or may be stand-alone units. Image capture device 316 may capture images of a viewing area where the user is positioned when a signal is received from remote control device 310. The captured images may be used to determine the location of the user in the viewing area.

The media application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media application is a client-server based application. Data for use by a thick or thin client implemented on user equipment device 300 is retrieved on-demand by issuing requests to a server remote to the user equipment device 300. In one example of a client-server based media application, control circuitry 304 runs a web browser that interprets web pages provided by a remote server.

In some embodiments, the media application is downloaded and interpreted or otherwise run by an interpreter or virtual machine (run by control circuitry 304). In some embodiments, the media application may be encoded in the ETV Binary Interchange Format (EBIF), received by control circuitry 304 as part of a suitable feed, and interpreted by a user agent running on control circuitry 304. For example, the media application may be an EBIF application. In some embodiments, the media application may be defined by a series of JAVA-based files that are received and run by a local virtual machine or other suitable middleware executed by control circuitry 304. In some of such embodiments (e.g., those employing MPEG-2 or other digital media encoding schemes), the media application may be, for example, encoded and transmitted in an MPEG-2 object carousel with the MPEG audio and video packets of a program.

Figure 4:
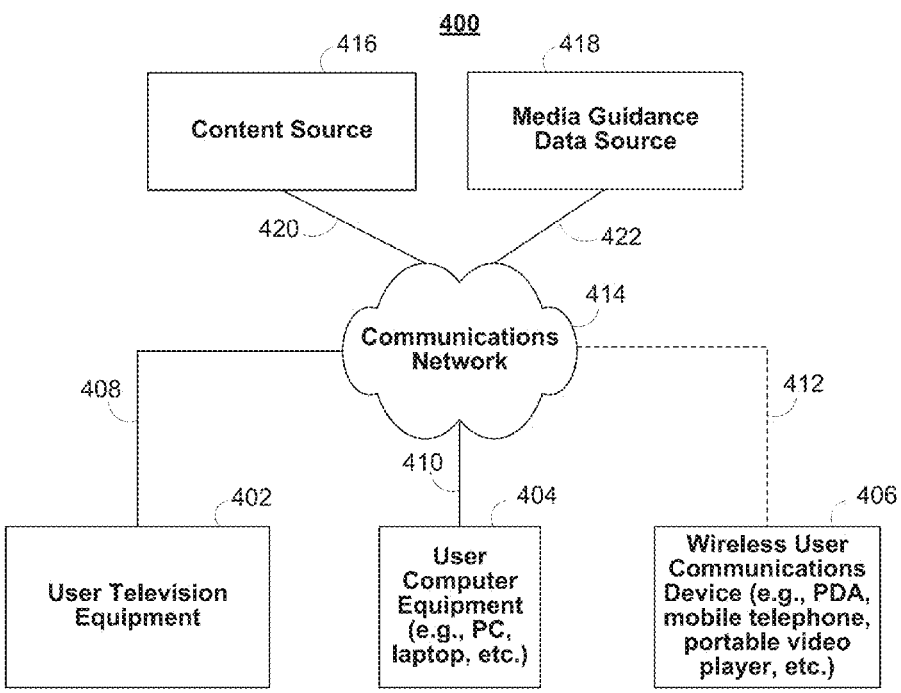
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media application may have the same layout on various different types of user equipment or may be tailored to the display capabilities of the user equipment. For example, on user computer equipment 404, the media application may be provided as a website accessed by a web browser. In another example, the media application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media application settings across in-home devices and remote devices. Settings include those described herein, as well as channel and program favorites, programming preferences that the media application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the media application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull advertisement data from a server, or a server may push advertisement data to a user equipment device. In some embodiments, a media application client residing on the user's equipment may initiate sessions with source 418 to obtain advertisement data when needed, e.g., when the advertisement data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media application itself or software updates for the media application.

Media applications may be, for example, stand-alone applications implemented on user equipment devices. For example, the media application may be implemented as software or a set of executable instructions which may be stored in storage 308, and executed by control circuitry 304 of a user equipment device 300. In some embodiments, media applications may be client-server applications where only a client application resides on the user equipment device, and server application resides on a remote server. For example, media applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media application may instruct the control circuitry to generate the media application displays and transmit the generated displays to the user equipment devices. The server application may instruct the control circuitry of the media guidance data source 418 to transmit data for storage on the user equipment. The client application may instruct control circuitry of the receiving user equipment to generate the media application displays.

Content and/or advertisement data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide advertisement data described above. In addition to content and/or advertisement data, providers of OTT content can distribute media applications (e.g., web-based applications or cloud-based applications), or the content can be displayed by media applications stored on the user equipment device.

Media guidance system 400 is intended to illustrate a number of approaches, or network configurations, by which user equipment devices and sources of content and advertisement data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media application implemented on a remote device. For example, users may access an online media application on a website via personal computers at their offices, or mobile devices such as a PDA or web-enabled mobile telephone. The user may set various settings (e.g., recordings, reminders, or other settings) on the online media application to control the user's in-home equipment. The online guide may control the user's equipment directly, or by communicating with a media application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media application to communicate directly with content source 416 to access content. Specifically, within a home, users of user television equipment 402 and user computer equipment 404 may access the media application to navigate among and locate desirable content. Users may also access the media application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations that provide cloud-based services to various types of users and devices connected via a network such as the Internet via communications network 414. These cloud resources may include one or more content sources 416 and one or more media guidance data sources 418. In addition, or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

The media application may incorporate, or have access to, one or more content capture devices or application, such as camcorders, digital cameras with video mode, audio recorders, mobile phones, and handheld computing devices, to generate data describing the attentiveness level of a user. The user can upload data describing the attentiveness level of a user to a content storage service on the cloud either directly, for example, from user computer equipment 404 or wireless user communications device 406 having a content capture feature. Alternatively, the user can first transfer the content to a user equipment device, such as user computer equipment 404. The user equipment device storing the data describing the attentiveness level of a user uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 is an illustrative display screen 500 for providing recommended media content in an interactive media guidance application in accordance with some embodiments of the disclosure. In FIG. 5, display screen 500 including prompt 502 may be generated automatically or responsive to a request from the user. Screen 500 may further include options 504, 506, 508, and 510 to assist the user receiving the recommended content. In some implementations, control circuitry 304 may generate screen 500 in response to receiving input from remote control device 310 held by the user. Control circuitry 304 may analyze the viewing area to determine the position of remote control device 310 and retrieve the user's profile based on the determined position. Control circuitry 304 may determine media content of interest to the user and generate screen 500 for recommending the media content to the user.

For example, control circuitry 304 may recommend to user "Mike" the television program "Korra: The Next Hero" as shown in FIG. 5. The user may select option 504 to view the recommended program. Alternatively, the user may select option 506 to add the program to a queue for viewing at a later item. The user may also select option 508 to ignore the recommendation and continue interacting with the media guidance application. Finally, if the user realizes that control circuitry 304 retrieved a user profile for another user, i.e., the user is not "Mike," the user may select option 510 to select the correct profile or to manually enter position information for determining the correct user profile as discussed in FIGS. 6A-6C below. Media recommendation displays and their functionalities are described in greater detail in Ellis et al. U.S. Pat. No. 6,898,762, issued May 24, 2005 and Corday et al. U.S. Patent Application Publication No. 2007/0157222, published Jul. 5, 2007, which are hereby incorporated by reference herein in their entireties.

Figure 6A:
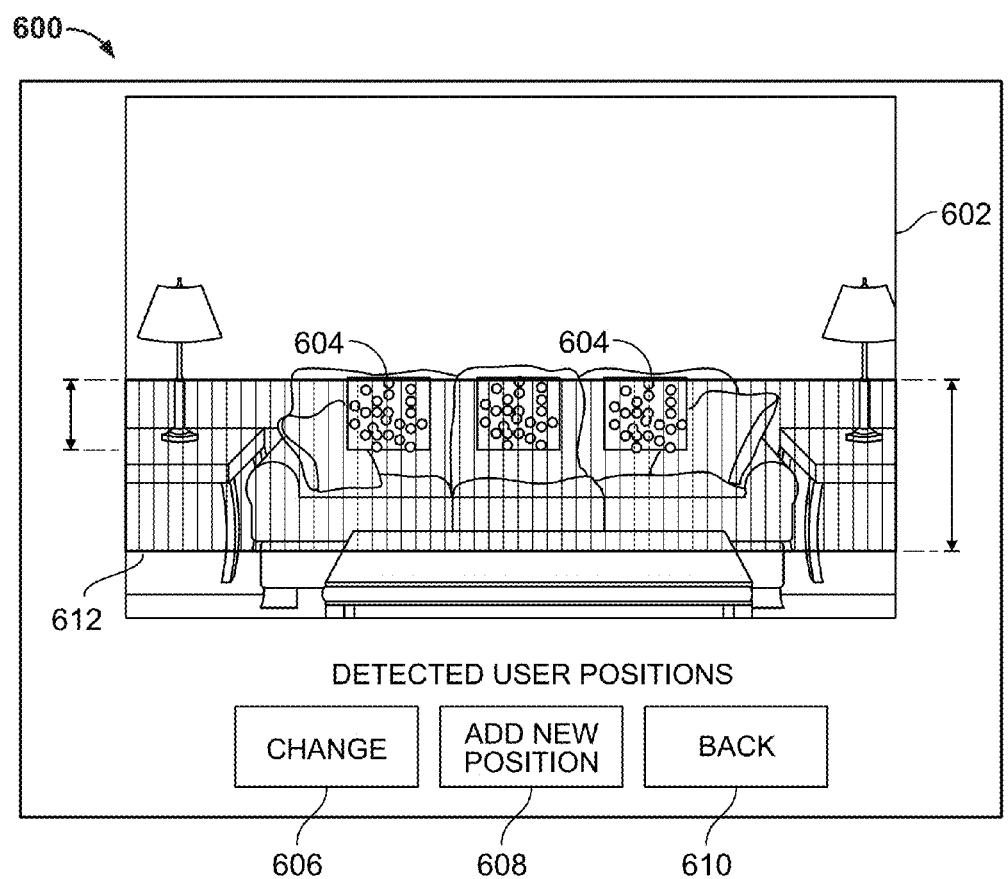
FIGS. 6A, 6B, and 6C are illustrative display screens for customizing the user's location in accordance with some embodiments of the disclosure.

FIG. 6A is an illustrative display screen 600 for customizing the user's location in accordance with some embodiments of the disclosure. In some implementations, the user may manually modify or add positions in the viewing area to associate with a user profile via display screen 600. The user profile may be constructed or retrieved based on viewing history or viewing preferences received via remote control device 310 from a given user position. Display screen 600 may be generated in response to receiving a user selection of option 510 shown in FIG. 5. Display screen 600 includes area 602 which shows an image of the viewing area captured using image capturing device 316. Control circuitry 304 may generate area 602 for display along with user areas 604 in the viewing area associated with respective user profiles. For example, screen 600 shows user areas 604 associated with different user profiles. Each mark in user area 604 indicates a stored user position from where an infrared signal was received from remote control device 310. Each user area 604 may be defined as a result of clustering the stored user positions. This clustering is described further with reference to FIGS. 9A and 9B below. Band 612 shows the typical positions in the viewing area from which remote control device signals may be received. The screen further includes options 606 and 608 for modifying and adding new positions in the viewing area, respectively. Alternatively, the user may select option 610 to go back to the previous screen. Selecting either option 606 or 608 may lead to a screen similar to the one illustrated in FIG. 6B. The user may correct any erroneous user profile associations or add a new user position to generate their user profile going forward.

Figure 6B:
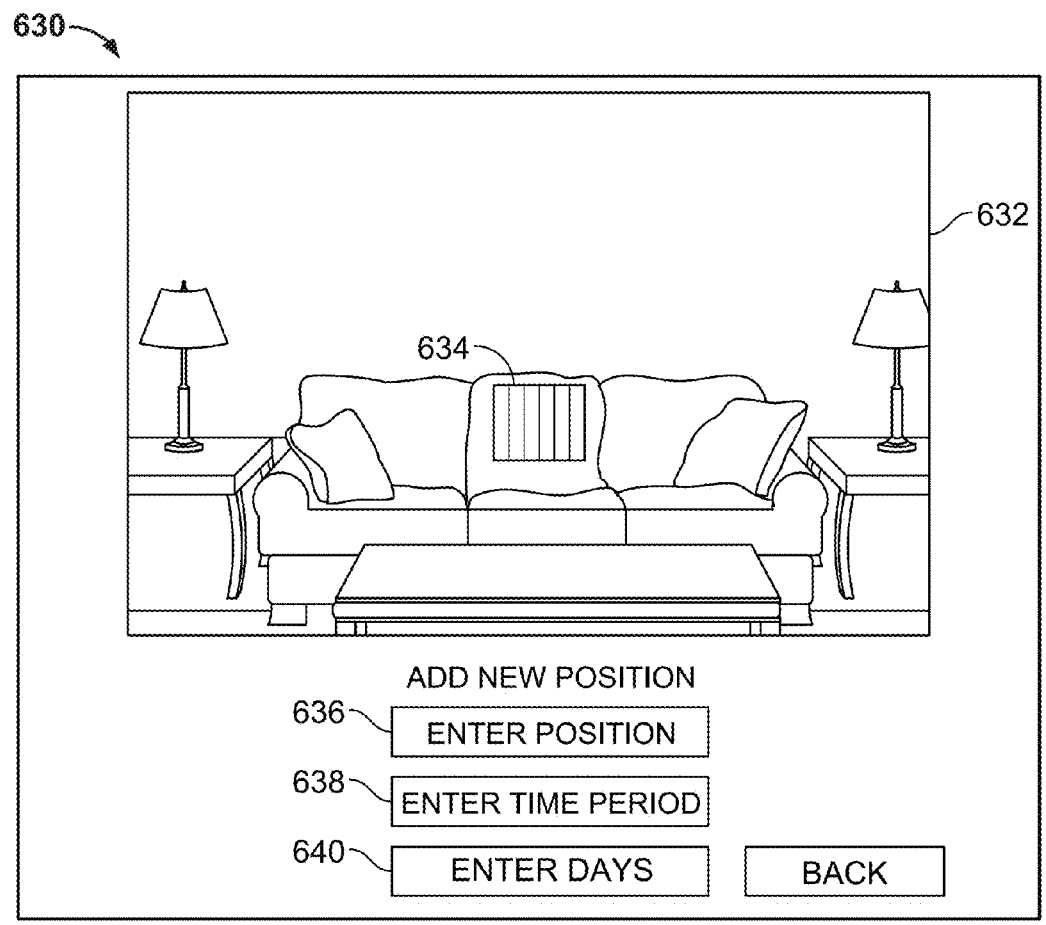

FIG. 6B is another illustrative display screen 630 for customizing the user's location in accordance with some embodiments of the disclosure. Display screen 630 may be generated in response to receiving a user selection of option 510 shown in FIG. 5 or options 606 or 608 in FIG. 6A. Display screen 630 includes area 632 which shows an image of the viewing area captured using image capturing device 316. Control circuitry 304 may generate area 632 for display along with a selectable user area window 634 in the viewing area for association with a particular user profile. The user may specify a particular position for themselves in the viewing area by selecting option 636 and using window 634 to indicate the desired user area. In addition, the user may specify time-based restrictions on the indicated user area. For example, the user may specify via option 638 that the indicated user area should be associated with the user only during 5 p.m. through 9 p.m. In another example, the user may specify via option 670 that the user area should be associated with the user only during Monday through Friday. Based on the information entered, control circuitry 304 may send instructions to construct or retrieve a user profile for the associated user position using viewing history and/or viewing preferences received from remote control device 310 during the specified time-based restrictions.

Figure 6C:
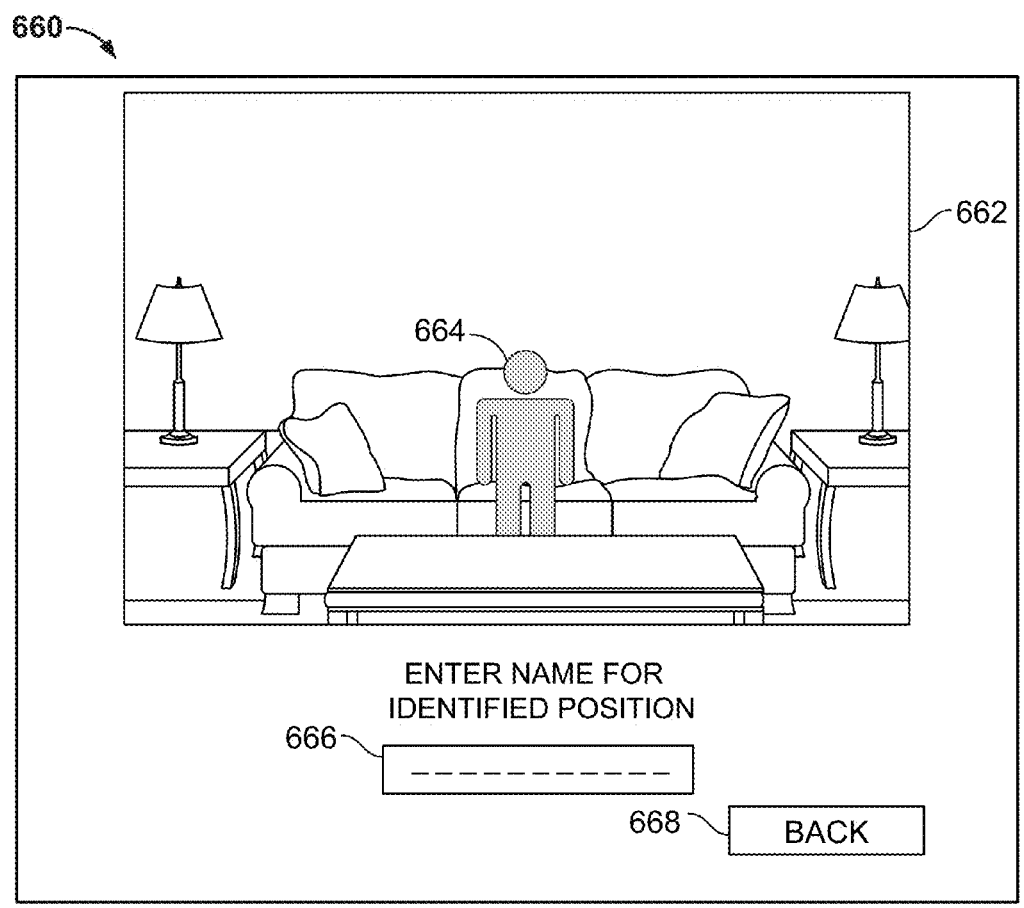

FIG. 6C is another illustrative display screen 660 for customizing the user's location in accordance with some embodiments of the disclosure. Display screen 660 may be generated after receiving a plurality of input signals from remote control device 310 in viewing area 662 over a period of time. In some embodiments, display screen 660 is generated after a user-specified number of input signals are received. In some embodiments, display screen 660 is generated after a sufficient number of input signals are received in order to perform clustering. Control circuitry 304 may cluster the plurality of input signals in viewing area 662 to define user area 664. Display screen 660 may display user area 664 and request that the user enter a name in prompt 666 to associate with user area 664. Once the name is received, control circuitry 304 may associate user area 664 with the user's name and a corresponding user profile. Any future remote control signals from user area 664 may be used to retrieve or further refine the user's profile including a viewing history and/or viewing preferences, e.g., volume, brightness, video quality, etc. Alternatively, the user may select option 668 to go back to the previous screen without associating user area 664 with the user's name. In some embodiments, selecting option 668 may lead to a screen similar to the one illustrated in FIG. 6B. The screen may allow the user to correct any erroneously identified positions or add a new user position to generate their user profile going forward.

Figure 7:
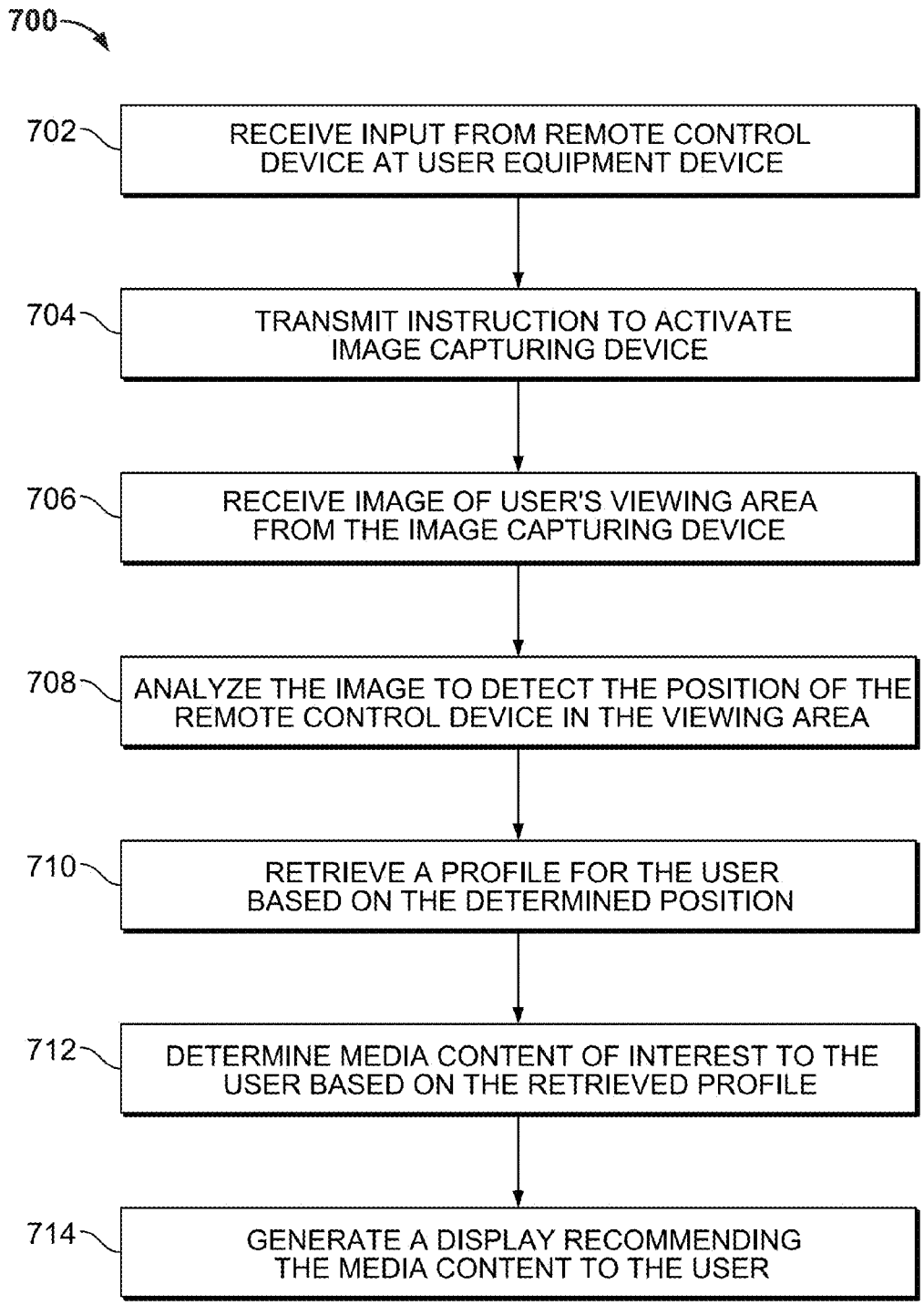
FIG. 7 is a flowchart of illustrative steps for detecting user location and making media content recommendations in accordance with some embodiments of the disclosure.

FIG. 7 is a flowchart 700 of illustrative steps for detecting user location and making media content recommendations in accordance with some embodiments of the disclosure. At step 702, sensor device 314 receives user input from remote control device 310. In some implementations, the user input includes an infrared (IR) signal from remote control device 310. Sensor device 314 sends an indication to control circuitry 304. At step 704, control circuitry 304 transmits an instruction to activate image capture device 316 to capture an image of the viewing area. At step 706, control circuitry 304 receives the image from image capture device 316. At step 708, control circuitry 304 analyzes the image to detect a position of remote control device 316 in the viewing area. In some implementations, control circuitry 304 identifies the location of pixels that are activated in the image due to the IR signal from remote control device 316. In some implementations, control circuitry 304 identifies a position of remote control device 316 using edge detection, corner detection, blob detection, or other such suitable image processing techniques. Such techniques are fundamental tools in image processing, machine vision and computer vision, particularly in the areas of feature detection and feature extraction. Control circuitry 304 may identify points in an image at which the image brightness changes sharply or has discontinuities to determine the position where the infrared signal is transmitted from remote control device 316 in the viewing area.

At step 710, control circuitry 304 retrieves a profile for the user based on the determined position in the viewing area. The user profile may include viewing history and/or viewing preferences for the user who typically uses remote control device 316 from the determined position in the viewing area. At step 712, control circuitry 304 determines media content of interest to the user based on their profile. For example, the control circuitry 304 may analyze the viewing history to determine programs similar to those previously viewed by the user. At step 714, control circuitry 304 generates a display for recommending the media content to the user.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure.

Figure 8A:
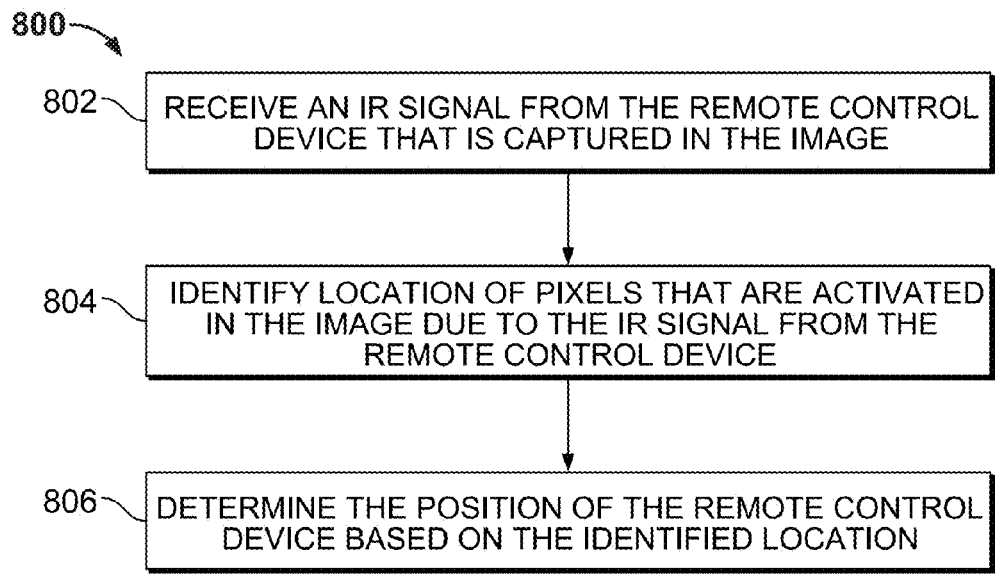
FIGS. 8A and 8B are flowcharts of illustrative steps for determining user location in accordance with some embodiments of the disclosure.

FIG. 8A is a flowchart 800 of illustrative steps for determining user location in accordance with some embodiments of the disclosure. In some implementations, control circuitry 304 follows process 800 at step 708 of FIG. 7. At step 802, sensor device 314 receives an infrared (IR) signal from remote control device 310. Sensor device 314 sends an indication to control circuitry 304, which in turn sends an instruction to image capture device 316 to capture an image of the viewing area. At step 804, control circuitry 304 analyzes the image received from image capture device 316 to detect a position of remote control device 316 in the viewing area. In particular, control circuitry 304 identifies the location of pixels that are activated in the image due to the IR signal from remote control device 316. For example, control circuitry 304 may compare the image to one or more previously or subsequently captured images to determine the pixels activated in the image due to the IR signal. At step 806, control circuitry 304 determines the position of remote control device 310 in the viewing area to be the position corresponding to the pixels activated in the captured image.

It is contemplated that the steps or descriptions of FIG. 8A may be used with any other embodiment of this disclosure. In addition, the steps and descriptions described in relation to FIG. 8A may be done in alternative orders or in parallel to further the purposes of this disclosure.

Figure 8B:
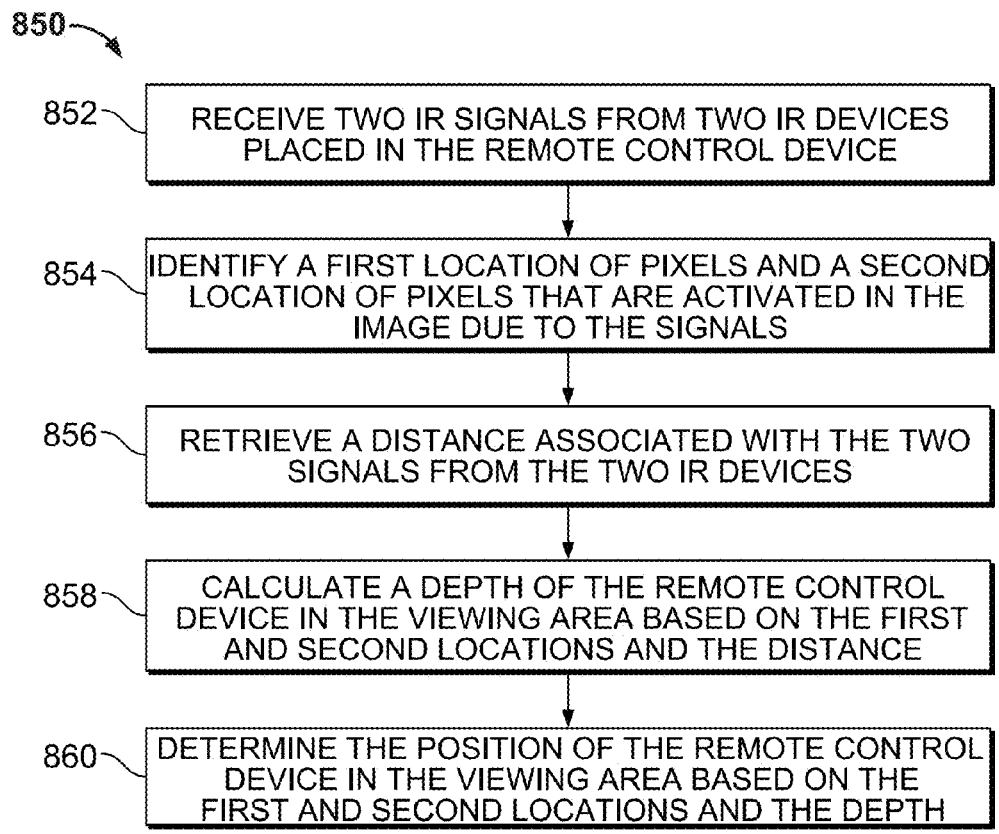

FIG. 8B is another flowchart 850 of illustrative steps for determining user location in accordance with some embodiments of the disclosure. In some implementations, control circuitry 304 follows process 850 at step 708 of FIG. 7. At step 852, sensor device 314 receives two infrared (IR) signals from two IR devices placed in remote control device 310. Sensor device 314 sends an indication to control circuitry 304, which in turn sends an instruction to image capture device 316 to capture an image of the viewing area. At step 854, control circuitry 304 analyzes the image received from image capture device 316 to detect a position of remote control device 316 in the viewing area. In particular, control circuitry 304 identifies the location of pixels that are activated in the image due to the two IR signals from remote control device 316. For example, control circuitry 304 may compare the image to a previously captured image to determine the pixels activated in the image due to the two IR signals.

At step 856, control circuitry 304 retrieves a distance between the two IR devices placed in remote control device 316. The distance is a fixed measure of the spacing between the two IR devices and may be used to calculate the distance of remote control device 316 from image capture device 316 and its location relative to image capture device 316 in the viewing area. At step 858, control circuitry 304 calculates the distance of remote control device 316 from image capture device 316 in the viewing area based on the first and second locations of the two IR signals in the captured image as well as the retrieved distance associated with the two IR signals. In some embodiments, image capture device 316 is built in to the display device or separately connected but adjacent to the display device. In such embodiments, the calculated distance may be used to approximate the distance of remote control device 316 from the display device. At step 860, control circuitry 304 determines the position of remote control device 310 in the viewing area based on the first and second positions corresponding to the pixels activated in the captured image due to the two IR signals and the calculated distance. The position in this case is a 3-dimensional value indicating the position of the user in the viewing area.

It is contemplated that the steps or descriptions of FIG. 8B may be used with any other embodiment of this disclosure. In addition, the steps and descriptions described in relation to FIG. 8B may be done in alternative orders or in parallel to further the purposes of this disclosure.

Figure 9A:
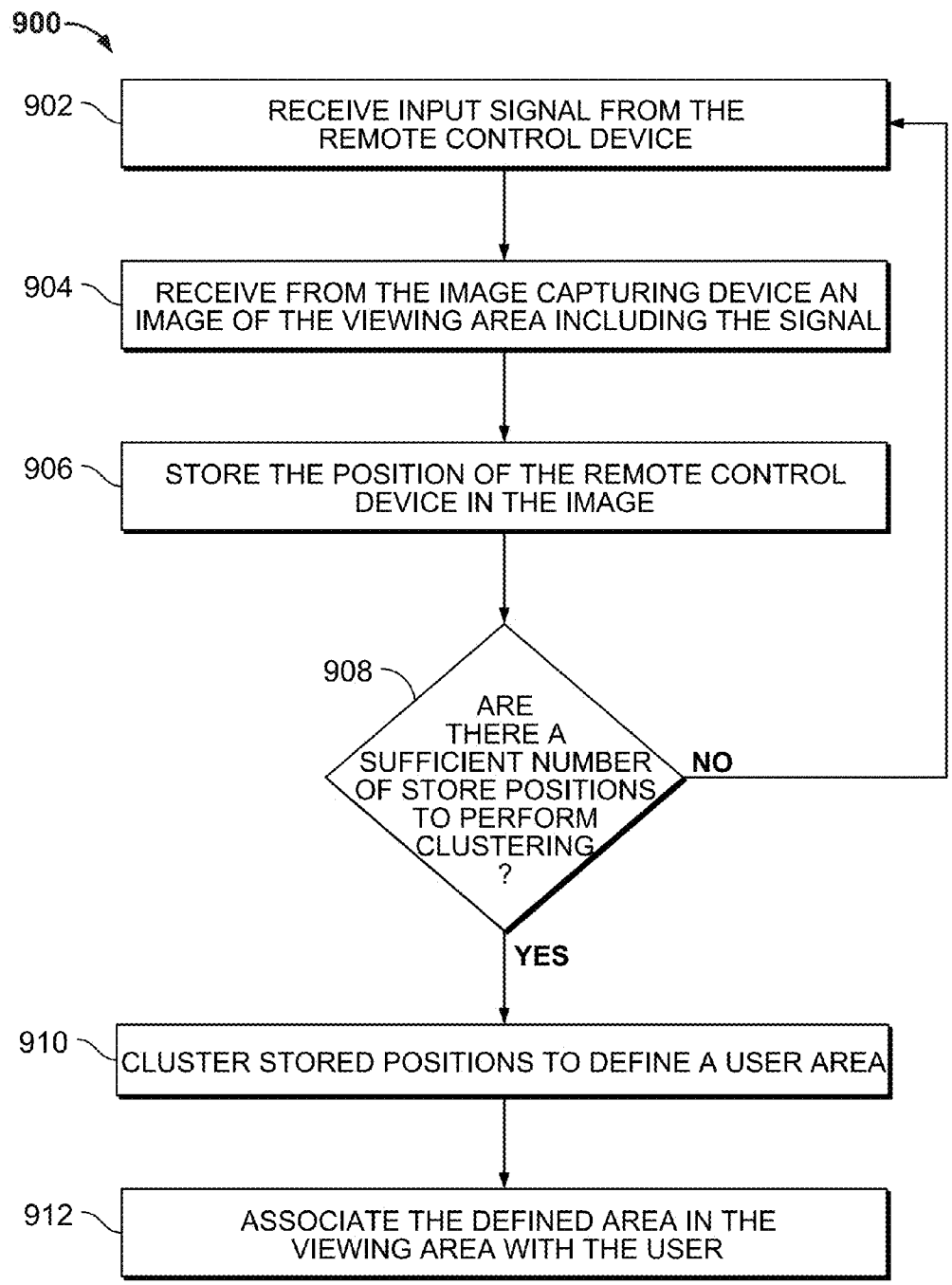
FIGS. 9A and 9B are flowcharts of illustrative steps for defining portions of the viewing area associated with one or more users in accordance with some embodiments of the disclosure.

FIG. 9A is a flowchart 900 of illustrative steps for defining portions of the viewing area associated with a user in accordance with some embodiments of the disclosure. In some implementations, the different captured positions of remote control device 316 in the viewing area may be clustered and associated with a user profile. At step 902, sensor device 314 receives an input signal from remote control device 310. Sensor device 314 sends an indication to control circuitry 304, which in turn sends an instruction to image capture device 316 to capture an image of the viewing area. At step 904, control circuitry 304 receives the image of the viewing area from image capture device 316.

At step 906, control circuitry 304 analyzes the image to identify the position of remote control device 316 in the viewing area according to one of the implementations described above and stores the position for later retrieval. At step 908, control circuitry 304 checks whether a sufficient number of positions have been stored to perform clustering on the stored positions. For example, control circuitry 304 may check against a predetermined threshold or determine a threshold for number of positions based on the size of the viewing area. If more positions are needed, control circuitry 304 returns to step 902. If sufficient positions have been stored, control circuitry 304 proceeds to step 910. At step 910, control circuitry 304 performs clustering on the stored user positions to define one or more user areas.

Clustering is the task of grouping a set of objects in such a way that objects in the same cluster are more similar to each other than to those in other clusters. It is a common technique for statistical data analysis used in many fields, including machine learning, pattern recognition, image analysis, information retrieval, and bioinformatics. Cluster analysis may be performed by various algorithms that differ significantly in their notion of what constitutes a cluster and how to efficiently find them. Popular notions of clusters include groups with small distances among the cluster members, dense areas of the data space, intervals or particular statistical distributions. For example, if most of the stored positions are concentrated in a particular portion of the viewing area, control circuitry 304 may cluster the stored positions into one user area. At step 912, control circuitry 304 associates the defined user area with a particular user. Any future remote control signals from the defined user area may be used to construct or retrieve a user profile including a viewing history and/or viewing preferences, e.g., volume, color, brightness, video quality, etc.

It is contemplated that the steps or descriptions of FIG. 9A may be used with any other embodiment of this disclosure. In addition, the steps and descriptions described in relation to FIG. 9A may be done in alternative orders or in parallel to further the purposes of this disclosure.

Figure 9B:
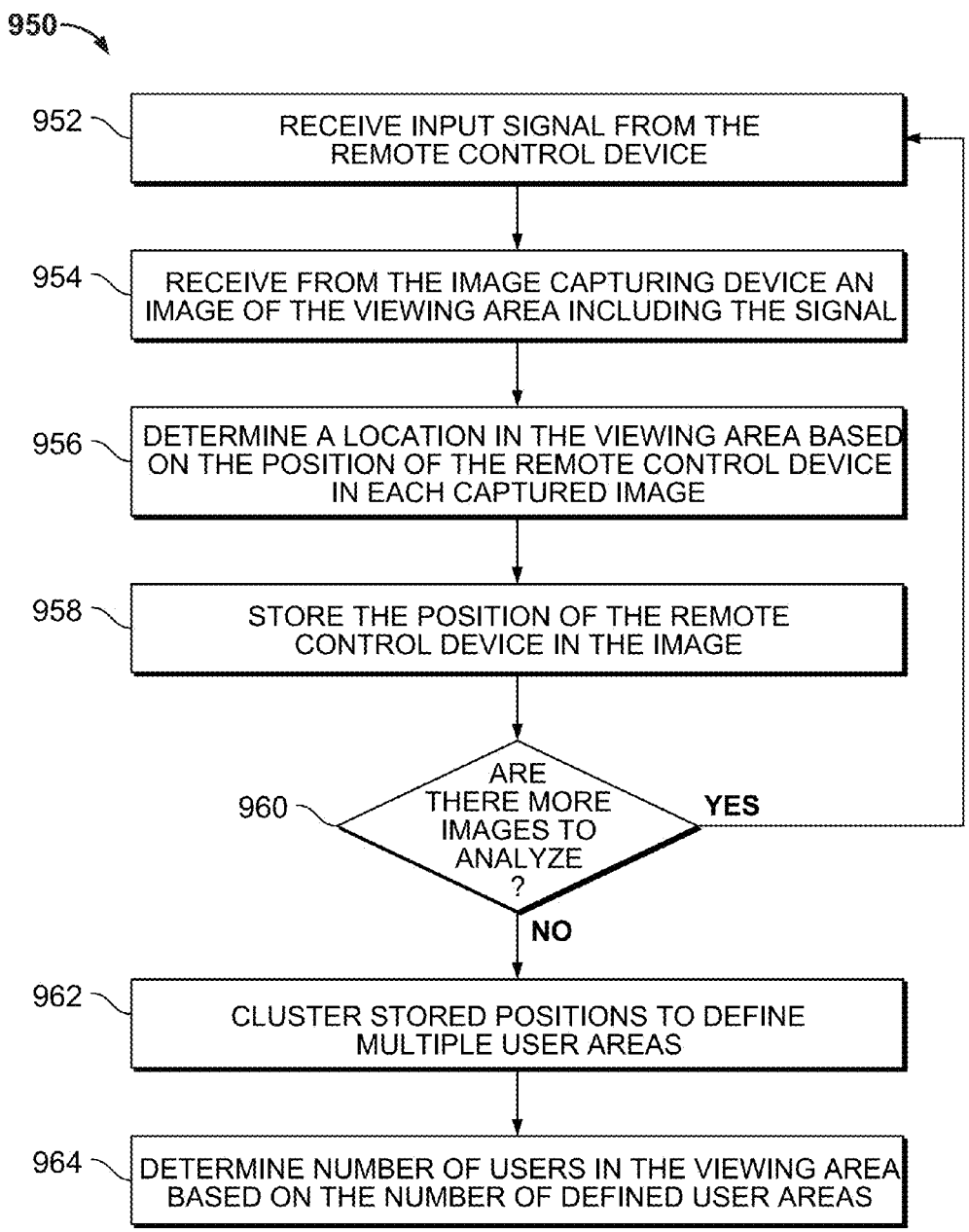

FIG. 9B is a flowchart 950 of illustrative steps for defining portions of the viewing area associated with multiple users in accordance with some embodiments of the disclosure. Control circuitry 304 determines multiple users in the viewing area by analyzing images collected over a period of time to determine the multiple users. In some implementations, each position of remote control device 316 in the viewing area may be associated with a different user profile. In some implementations, the different captured positions over a period of time of remote control device 316 in the viewing area may be clustered and each cluster associated with a different user profile. At step 952, sensor device 314 receives an input signal from remote control device 310. Sensor device 314 sends an indication to control circuitry 304, which in turn sends an instruction to image capture device 316 to capture an image of the viewing area. At step 954, control circuitry 304 receives the image of the viewing area from image capture device 316.

At step 956, control circuitry 304 analyzes the image to identify the position of remote control device 316 in the viewing area according to one of the implementations described above. At step 958, control circuitry 304 stores the position for later retrieval. At step 960, control circuitry 304 checks whether additional images remain to be analyzed from the images that have been received over the given period of time. If additional images remain to be analyzed, control circuitry 304 returns to step 952. If all images have been analyzed, control circuitry 304 proceeds to step 962. At step 962, control circuitry 304 performs clustering on the stored user positions to define multiple user areas. At step 912, control circuitry 304 associates each defined user area with a different user. Any future remote control signals from the defined user areas may be used to construct or retrieve corresponding user profiles including a viewing history and/or viewing preferences, e.g., volume, brightness, video quality, etc.

It is contemplated that the steps or descriptions of FIG. 9B may be used with any other embodiment of this disclosure. In addition, the steps and descriptions described in relation to FIG. 9B may be done in alternative orders or in parallel to further the purposes of this disclosure.

In some implementations, the user equipment device may automatically detect and define user areas in the viewing area based on the positions where the remote control device is activated during particular time periods, e.g., particular blocks of time and/or particular days. The user equipment device may "learn" the correlation between a user area and the content selected from that user area by keeping track of the viewing history and related viewing preferences, e.g., by monitoring and storing the content selections the user makes and/or other interactions the user may have with the guidance application. Each user area may be associated with a user profile including viewing history and viewing preferences for the given time period.

For example, when the remote is detected in the user area on a weekday, the user equipment device may retrieve profile A and make personalized content recommendations including soap operas. However, when the remote is detected in the user area on a weekend, the user equipment device may instead retrieve profile B and make personalized content recommendations including football games. In another example, when the remote is detected in the user area between 9 am and 12 pm, the user equipment device may retrieve profile C and make personalized content recommendations including day time shows. However, when the remote is detected in the user area between 6 pm and 9 pm, the user equipment device may instead retrieve profile D and make personalized content recommendations including prime time shows.

The user equipment device may automatically determine the time period or the user equipment device may receive user input defining the time period. In some embodiments, the user equipment device analyzes the viewing history and related viewing preferences and clusters them to determine time periods. For example, the user equipment device may analyze the viewing history and cluster the soap operas into cluster A' to form profile A for weekdays. The user equipment device may analyze the viewing history and cluster the football games into cluster B' to form profile B for weekends. In another example, the user equipment device may analyze the viewing history and cluster the day time shows into cluster C' to form profile C for the time period between 9 am and 12 pm. The user equipment device may analyze the viewing history and cluster the prime time shows into cluster D' to form profile D for the time period between 6 pm and 9 pm.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for recommending content, the method comprising:
receiving, at a user equipment device during a first time interval, a first input from a remote control device operated by a first user positioned in a viewing area;
in response to receiving the first input:
transmitting a first instruction to activate an image capturing device; and
receiving, from the image capturing device, a first image of the viewing area;
detecting in the received first image that the remote control device is positioned at a position;
retrieving, from the storage device, a first profile associated with a portion of the viewing area that includes the detected position of the remote control device in the received first image;
determining a first media content of interest based on the retrieved first profile;
generating a display recommending the first media content to the first user;
receiving, at the user equipment device during the first time interval, a second input from the remote control device operated by a second user positioned in the viewing area, wherein the second user is different from the first user;
in response to receiving the second input:
transmitting a second instruction to activate the image capturing device; and
receiving, from the image capturing device, a second image of the viewing area;
detecting in the received second image that the remote control device is positioned at the position;
retrieving, from the storage device, the first profile associated with the portion of the viewing area that includes the detected position of the remote control device in the received second image;
determining a second media content of interest based on the retrieved first profile; and
generating a display recommending the second media content to the second user.

2. The method of claim 1, wherein the retrieved first profile includes a viewing history of media content selected when the remote control device was positioned in a vicinity of the determined position in the viewing area.

3. The method of claim 2, wherein the viewing history includes at least one of (i) the media content selected in a vicinity of a particular time, and (ii) the media content selected on a particular day.

4. The method of claim 1, wherein detecting in the received first image that the remote control device is positioned at the position comprises:
receiving a signal from the remote control device that is captured in the first image;
identifying a location of one or more pixels that are activated in the first image due to the signal from the remote control device; and
determining the position of the remote control device based on the identified location.

5. The method of claim 1, the method further comprising:
receiving two signals simultaneously from the remote control device;
identifying a first location of one or more pixels and a second location of one or more pixels that are activated in the first image due to the two signals from the remote control device;
retrieving a distance associated with the two signals;
calculating a distance of the remote control device from a display device in the viewing area based on the identified first and second locations and the retrieved distance; and
determining the position of the remote control device based on the identified first and second locations and the distance.

6. The method of claim 5, wherein the two signals are received simultaneously from two infrared (IR) devices included in the remote control device.

7. The method of claim 1, the method further comprising:
determining a location of a third user in the viewing area when the second user is in the viewing area;
retrieving, from the storage device, a profile based on the location of the third user; and
determining at least one media content of interest to both users based on the retrieved profiles.

8. The method of claim 7, wherein determining the location of the third user in the viewing area comprises:
analyzing the received second image to detect silhouettes corresponding to one or more users;
retrieving, from the storage device, a silhouette for the third user;
comparing the retrieved silhouette for the third user to the silhouettes detected in the second image; and
determining the location of the third user in the viewing area based on the comparison.

9. The method of claim 1, the method further comprising:
receiving a plurality of inputs from the remote control device over a period of time;
receiving, from the image capturing device, a plurality of images of the viewing area over the period of time;
clustering a plurality of positions in the viewing area to define a user area based on the position of the remote control device in each captured image; and
associating the defined user area with the first user.

10. The method of claim 9, the method further comprising:
receiving, from the image capturing device, the first image of the viewing area;
analyzing the received first image to detect the position of the remote control device;
determining the user area associated with the detected position; and retrieving, from the storage device, the first profile associated with the portion of the viewing area based on the determined user area.

11. A system for recommending content, the system comprising:
control circuitry configured to:
receive a first input from a remote control device operated by a first user positioned in a viewing area;
in response to receiving the first input;
transmit a first instruction to activate an image capturing device; and
receive, from the image capturing device, a first image of the viewing area;
detect in the received first image that the remote control device is positioned at a position;
retrieve, from a storage device, a first profile associated with a portion of the viewing area that includes the detected position of the remote control device in the received first image;
determine a first media content of interest based on the retrieved first profile;
generate a display recommending the first media content to the first user;
receive, at the user equipment device, a second input from the remote control device operated by a second user positioned in the viewing area, wherein the second user is different from the first user;
in response to receiving the second input:
transmit a second instruction to activate the image capturing device; and
receive, from the image capturing device, a second image of the viewing area;
detect in the received second image that the remote control device is positioned at the position;
retrieve, from the storage device, the first profile associated with the portion of the viewing area that includes the detected position of the remote control device in the received second image;
determine a second media content of interest based on the retrieved first profile; and
generate a display recommending the second media content to the second user.

12. The system of claim 11, wherein the retrieved first profile is based on a viewing history of media content selected when the remote control device is positioned in a vicinity of the determined position in the viewing area.

13. The system of claim 12, wherein the viewing history only includes at least one of (i) the media content selected in a vicinity of a particular time, and (ii) the media content selected on a particular day.

14. The system of claim 11, wherein the control circuitry for detecting in the received first image that the remote control device is positioned at the position is further configured to:
receive a signal from the remote control device that is captured in the first image;
identify a location of one or more pixels that are activated in the first image due to the signal from the remote control device; and
determine the position of the remote control device based on the identified location.

15. The system of claim 11, wherein the control circuitry is further configured to:
receive two signals simultaneously from the remote control device;
identify a first location of one or more pixels and a second location of one or more pixels that are activated in the first image due to the two signals from the remote control device;
retrieve a distance associated with the two signals;
calculate a distance of the remote control device from a display device in the viewing area based on the identified first and second locations and the retrieved distance; and
determine the position of the remote control device based on the identified first and second locations and the distance.

16. The system of claim 15, wherein the two signals are received simultaneously from two infrared (IR) devices included in the remote control device.

17. The system of claim 11, wherein the control circuitry is further configured to:
determine a location of a third user in the viewing area when the second user is in the viewing area;
retrieve, from the storage device, a profile based on the location of the third user; and
determine at least one media content of interest to both users based on the retrieved profiles.

18. The system of claim 17, wherein the control circuitry for determining the location of the third user in the viewing area is further configured to:
analyze the received second image to detect silhouettes corresponding to one or more users;
retrieve, from the storage device, a silhouette for the third user;
compare the retrieved silhouette for the third user to the silhouettes detected in the second image; and
determine the location of the third user in the viewing area based on the comparison.

19. The system of claim 11, wherein the control circuitry is further configured to:
receive a plurality of inputs from the remote control device over a period of time;
receive, from the image capturing device, a plurality of images of the viewing area over the period of time;
cluster a plurality of positions in the viewing area to define a user area based on the position of the remote control device in each captured image; and
associate the defined user area with the first user.

20. The system of claim 19, wherein the control circuitry is further configured to:
receive, from the image capturing device, the first image of the viewing area;
analyze the received first image to detect the position of the remote control device;
determine the user area associated with the detected position; and
retrieve, from the storage device, the first profile associated with the portion of the viewing area based on the determined user area.

21. The method of claim 1, wherein retrieving the first profile further comprises:
determining when the detected position of the remote control is within a user area; and
based on the determining, retrieving the first profile associated with the user area.

22. The system of claim 11, wherein the control circuitry for retrieving the first profile is further configured to:
determine when the detected position of the remote control is within a user area; and
based on the determining, retrieve the first profile associated with the user area.

23. The method of claim 1, further comprising:
receiving, at the user equipment device during a second time interval, a third input from the remote control device operated by the first user positioned in the viewing area, wherein the second time interval is different from the first time interval;
in response to receiving the third input:
transmitting a third instruction to activate the image capturing device; and
receiving, from the image capturing device, a third image of the viewing area;
detecting in the received third image that the remote control device is positioned at the position;
retrieving, from the storage device, a second profile associated with the portion of the viewing area that includes the detected position of the remote control device, wherein the second profile is different from the first profile;
determining a third media content of interest based on the retrieved second profile; and
generating a display recommending the third media content to the first user.

24. The system of claim 11, wherein the control circuitry is further configured to:
receive, during a second time interval, a third input from the remote control device operated by the first user positioned in the viewing area, wherein the second time interval is different from the first time interval;
in response to receiving the third input:
transmit a third instruction to activate the image capturing device; and
receive, from the image capturing device, a third image of the viewing area;
detect in the received third image that the remote control device is positioned at the position;
retrieve, from the storage device, a second profile associated with the portion of the viewing area that includes the detected position of the remote control device, wherein the second profile is different from the first profile;
determine a third media content of interest based on the retrieved second profile; and
generate a display recommending the third media content to the first user.

* * * * *